United States Patent
Miyazaki et al.

(10) Patent No.: US 9,650,543 B2
(45) Date of Patent: May 16, 2017

(54) POLYIMIDE PRECURSOR COMPOSITION, METHOD FOR MANUFACTURING POLYIMIDE MOLDED BODY, AND POLYIMIDE MOLDED BODY

(71) Applicant: FUJI XEROX CO., LTD., Tokyo (JP)

(72) Inventors: Kana Miyazaki, Minamiashigara (JP); Tsuyoshi Miyamoto, Minamiashigara (JP); Katsumi Nukada, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/341,429

(22) Filed: Jul. 25, 2014

(65) Prior Publication Data
US 2015/0267051 A1 Sep. 24, 2015

(30) Foreign Application Priority Data

| Mar. 18, 2014 | (JP) | 2014-055491 |
|---|---|---|
| Mar. 18, 2014 | (JP) | 2014-055493 |
| Mar. 18, 2014 | (JP) | 2014-055494 |

(51) Int. Cl.
C09D 179/08 (2006.01)
C08G 73/10 (2006.01)

(52) U.S. Cl.
CPC ......... *C09D 179/08* (2013.01); *C08G 73/105* (2013.01); *C08G 73/1067* (2013.01); *C08G 73/1071* (2013.01)

(58) Field of Classification Search
CPC ... C08L 79/08; C09D 179/08; C08G 73/1067; C08K 5/19
USPC ....................................................... 524/115
See application file for complete search history.

(56) References Cited

U.S. PATENT DOCUMENTS

| 4,238,528 A | 12/1980 | Angelo et al. |
| 5,719,253 A | 2/1998 | Echigo et al. |
| 2010/0193748 A1* | 8/2010 | Hama ................. C08L 79/08 252/503 |
| 2011/0070540 A1* | 3/2011 | Vanbesien .......... G03G 9/08797 430/109.4 |
| 2013/0171520 A1 | 7/2013 | Nakayama et al. |
| 2013/0230724 A1 | 9/2013 | Miyamoto et al. |
| 2014/0213723 A1 | 7/2014 | Miyamoto et al. |
| 2014/0213724 A1 | 7/2014 | Miyamoto et al. |

FOREIGN PATENT DOCUMENTS

| CN | 103097463 A | 5/2013 |
| CN | 103965473 A | 8/2014 |
| CN | 103965625 A | 8/2014 |
| JP | A-8-15519 | 1/1996 |
| JP | A-8-59832 | 3/1996 |
| JP | A-8-120077 | 5/1996 |
| JP | A-8-157599 | 6/1996 |
| JP | A-2003-13351 | 1/2003 |
| JP | A-2012-36382 | 2/2012 |

OTHER PUBLICATIONS

Sroog, "Polyimides," *J. Polymer Sci.: Macromolecular Reviews*, 1976, vol. 11, pp. 161-208.
Feb. 27, 2017 Office Action issued in Chinese Application No. 201410478835.8.

* cited by examiner

Primary Examiner — Doris Lee
(74) Attorney, Agent, or Firm — Oliff PLC

(57) ABSTRACT

There is provided a polyimide precursor composition, wherein a resin having a repeating unit represented by the following general formula (I), an organic amine compound, and a surfactant are dissolved in a water-based solvent including water:

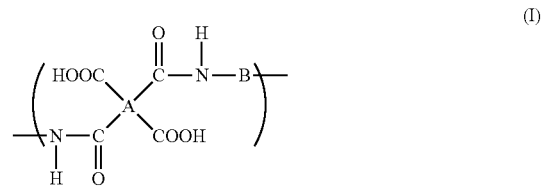

(I)

wherein in the general formula (I), A represents a tetravalent organic group, and B represents a divalent organic group, a method for manufacturing a polyimide molded body, wherein the polyimide precursor composition is molded by a heat treatment, and a polyimide molded body manufactured by the method for manufacturing a polyimide molded body.

21 Claims, No Drawings

POLYIMIDE PRECURSOR COMPOSITION, METHOD FOR MANUFACTURING POLYIMIDE MOLDED BODY, AND POLYIMIDE MOLDED BODY

CROSS-REFERENCE TO RELATED APPLICATIONS

This application is based on and claims priority under 35 USC 119 from Japanese Patent Application No. 2014-55491 filed on Mar. 18, 2014 and Japanese Patent Application No. 2014-55493 filed on Mar. 18, 2014, and Japanese Patent Application No. 2014-55494 filed on Mar. 18, 2014.

BACKGROUND

1. Field

The present invention relates to a polyimide precursor composition, a method for manufacturing a polyimide molded body, and a polyimide molded body.

2. Description of the Related Art

A polyimide resin is a material having high durability and excellent heat resistance, and is widely used in electronic material applications.

As a method for manufacturing a molded body of the polyimide resin, a method in which a polyimide precursor composition in which a polyamic acid which is a precursor thereof is dissolved in an aprotic polar solvent such as N-methyl-2-pyrrolidone (NMP) is coated on a substrate, and by a heat treatment, the resultant product is dried and imidized, whereby a polyimide molded body is manufactured is known (for example, see U.S. Pat. No. 4,238,528).

In addition, in the manufacture of the polyimide precursor composition, it is also known that a process in which a polyimide precursor resin is polymerized in an aprotic polar solvent such as NMP, and the polyimide precursor resin is taken out by reprecipitation, and dissolved in water by applying an amine salt is performed (for example, see JP-A-08-120077, JP-A-08-015519, JP-A-2003-13351 and JP-A-08-059832).

Moreover, examples of the solvent to dissolve the polyamic acid include dimethyl acetamide (DMAc), dimethyl formamide (DMF), dimethyl sulfoxide (DMSO), γ-butyrolactone (γ-BL), and the like in addition to NMP (for example, see Journal of Polymer Science, Macromolecular Reviews, Vol. 11, P. 164 (1976)).

On the other hand, as the aprotic polar solvent, a water-soluble alcohol-based solvent compound and/or a water-soluble ether-based solvent compound is used, and specifically, it is known that by adding a tertiary amine to a reaction system in a mixed solvent of tetrahydrofuran (THF) and methanol, or THF and water, a polyimide precursor composition is obtained without precipitation (for example, see JP-A-08-157599).

It is also known that in the coexistence of imidazole having a specific structure as an amine compound, a water-based polyimide precursor composition is obtained by polymerizing the polyimide precursor in water (for example, see JP-A-2012-036382).

SUMMARY

<1> A polyimide precursor composition,
wherein a resin having a repeating unit represented by the following general formula (I), an organic amine compound, and a surfactant are dissolved in a water-based solvent including water:

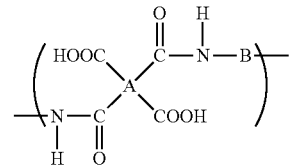

in the general formula (I),
A represents a tetravalent organic group, and
B represents a divalent organic group.

DETAILED DESCRIPTION

Hereinafter, embodiments of the invention will be described in detail.

<Polyimide Precursor Composition>

The polyimide precursor composition according to the embodiment is a composition in which a resin having a repeating unit represented by the general formula (I) (hereinafter, referred to as "specific polyimide precursor"), an organic amine compound, and a surfactant are dissolved in a water-based solvent including water. That is, the specific polyimide precursor, the organic amine compound, and the surfactant are included in the composition in the state of being dissolved in a water-based solvent. Moreover, dissolution refers to a state in which the residue of a dissolved material is not visually confirmed.

Here, as the surfactant, for example, a cationic surfactant, an anionic surfactant, and a nonionic surfactant can be exemplified.

The polyimide precursor composition according to the embodiment (containing a cationic surfactant as the surfactant) has excellent storage stability (hereinafter, also referred to as "pot life"). The reason for this is not clear, but is considered to be as follows.

First, in the polyimide precursor composition according to the embodiment, when an organic amine compound is dissolved in a water-based solvent, the specific polyimide precursor (the carboxyl group thereof) becomes an amine-salified state by an amine compound. For this reason, the solubility of the specific polyimide precursor with respect to a water-based solvent is increased, and the polyimide precursor composition including an organic amine compound has the high film-forming properties, and is suitable for a composition for forming the polyimide molded body.

However, the organic amine compound tends to lower the storage stability of the polyimide precursor composition. That is, in the polyimide precursor composition in which only the organic amine compound of the amount of the specific polyimide precursor which is dissolved in a water-based solvent is mixed, a viscosity variation tends to easily occur under room temperature (for example, 25° C.) environment.

In contrast, when a cationic surfactant is dissolved in a water-based solvent with an organic amine compound, as the organic amine compound, the cationic surfactant also contributes to the salification of the specific polyimide precursor (the carboxyl group thereof). That is, even in the same amount of the organic amine compound, the solubility of the specific polyimide precursor with respect to a water-based solvent is increased. In other words, even when the amount of the organic amine compound is reduced, the solubility of the specific polyimide precursor with respect to a water-based solvent is increased. For this reason, a viscosity variation is less likely to occur.

Therefore, it is estimated that the polyimide precursor composition according to the embodiment has excellent storage stability.

In addition, as described above, by the polyimide precursor composition according to the embodiment, the amount of the organic amine compound can be reduced without impairing the solubility of the specific polyimide precursor with respect to a water-based solvent. In addition to this, it is estimated that when a cationic surfactant is dissolved in a water-based solvent with an organic amine compound, the cationic surfactant forms a salt with an organic amine compound which does not contribute to the amine salification of the specific polyimide precursor. When the organic amine compound which does not contribute to the amine salification of the specific polyimide precursor forms a salt with the cationic surfactant, the apparent molecular weight of the organic amine compound is increased, and volatilization is less likely to occur. For this reason, in the polyimide precursor composition according to the embodiment, peculiar odor of the organic amine compound can be suppressed. That is, in both cases of handling the composition and molding by heating the composition, the load of the operator can be suppressed by low odor.

Then, the polyimide molded body molded using the polyimide precursor composition according to the embodiment has high surface smoothness. In addition, various characteristics such as mechanical properties, the heat resistance, electrical characteristics, and solvent resistance are also high. In addition, since the polyimide precursor composition has excellent storage stability, the coating performance of the polyimide precursor composition is easily maintained highly, and variation in quality of the polyimide molded body is also suppressed.

Here, since, when the organic amine compound is included in the polyimide molded body, the organic amine compound is easily volatilized by heating during molding, voids are easily generated on the surface of the polyimide molded body, and appearance quality (that is surface smoothness) of the molded body is reduced. In contrast, when an organic amine compound and a cationic surfactant are used in combination, and the used amount of the organic amine compound and volatility are reduced, void generation on the surface of the polyimide molded body is suppressed, and surface smoothness increases.

In the polyimide precursor composition according to the embodiment, since the specific polyimide precursor, the organic amine compound, and the cationic surfactant are dissolved in a water-based solvent, when molding the polyimide molded body, corrosion of the substrate which is a base is suppressed. It is considered that this is because the acidity of the carboxyl group in the specific polyimide precursor is suppressed by the basicity of the organic amine compound and the cationic surfactant which coexist.

In the polyimide precursor composition according to the embodiment, when the specific polyimide precursor (for example, a resin synthesized from an aromatic tetracarboxylic dianhydride and an aromatic diamine compound) in which A represents a tetravalent aromatic organic group and B represents a divalent aromatic organic group in the general formula (I) is applied, usually, there is a tendency that the specific polyimide precursor is not easily dissolved in a solvent, and thus, a water-based solvent is applied as a solvent, and the specific polyimide precursor is dissolved in the state in which the specific polyimide precursor is salified by the organic amine compound and the cationic surfactant in the water-based solvent. For this reason, even in case of applying an aromatic polyimide precursor as the specific polyimide precursor, the film-forming properties are high, and environment suitability is excellent.

The polyimide precursor composition according to the embodiment (containing an anionic surfactant as the surfactant) is a compound in which a resin having a repeating unit represented by the general formula (I) (hereinafter, referred to as "specific polyimide precursor"), an organic amine compound, and an anionic surfactant are dissolved in a water-based solvent including water. That is, the specific polyimide precursor, the organic amine compound, and the anionic surfactant are included in the composition in the state of being dissolved in a water-based solvent. Moreover, dissolution refers to a state in which the residue of a dissolved material is not visually confirmed.

In the polyimide precursor composition according to the embodiment, peculiar odor of an organic amine compound is suppressed. The reason for this is not clear, but is considered to be as follows.

First, in the polyimide precursor composition according to the embodiment, when an organic amine compound is dissolved in an aqueous solvent, the specific polyimide precursor (the carboxyl group thereof) becomes an aminesalified state by an amine compound. For this reason, the solubility of the specific polyimide precursor with respect to a water-based solvent is increased, and the polyimide precursor composition including an organic amine compound has high film-forming properties, and is suitable for a composition for forming the polyimide molded body.

However, in the polyimide precursor composition including an organic amine compound, an organic amine compound which does not contribute to the amine salification of the specific polyimide precursor is also present. For this reason, the organic amine compound is volatilized, and thus, peculiar odor of the organic amine compound is given off.

In contrast, it is estimated that when an anionic surfactant is dissolved in a water-based solvent with an organic amine compound, the anionic surfactant forms a salt with an organic amine compound which does not contribute to the amine salification of the specific polyimide precursor. When the organic amine compound which does not contribute to the amine salification of the specific polyimide precursor forms a salt with the anionic surfactant, the apparent molecular weight of the organic amine compound is increased, and volatilization is less likely to occur.

Therefore, it is estimated that in the polyimide precursor composition according to the embodiment, peculiar odor of the organic amine compound is suppressed. That is, in both cases of handling the polyimide precursor composition according to the embodiment and molding by heating the composition, the load of the operator can be suppressed by low odor.

In addition, the polyimide molded body molded using the polyimide precursor composition according to the embodiment has high surface smoothness. In addition, various characteristics such as mechanical properties, heat resistance, electrical characteristics, and solvent resistance are also high.

Here, since when the organic amine compound is included in the polyimide molded body, the organic amine compound is more easily volatilized by heating during molding, voids are easily generated on the surface of the polyimide molded body, and appearance quality (that is surface smoothness) of the molded body is reduced. In contrast, when an organic amine compound and an anionic surfactant are used in combination, and volatility of the organic amine compound is reduced, void generation on the surface of the polyimide molded body are suppressed, and surface smoothness increases.

In the polyimide precursor composition according to the embodiment, since the specific polyimide precursor and the organic amine compound are dissolved in a water-based solvent, when molding the polyimide molded body, corrosion of the substrate which is a base is suppressed. It is considered that this is because the acidity of the carboxyl group in the specific polyimide precursor is suppressed by the basicity of the organic amine compound which coexists.

In the polyimide precursor composition according to the embodiment, when the specific polyimide precursor (for example, a resin synthesized from an aromatic tetracarboxylic dianhydride and an aromatic diamine compound) in which A represents a tetravalent aromatic organic group and B represents a divalent aromatic organic group in the general formula (I) is applied, usually, there is a tendency that the specific polyimide precursor is not easily dissolved in a solvent, and thus, a water-based solvent is applied as a solvent, and the specific polyimide precursor is dissolved in the state in which the specific polyimide precursor is salified by the organic amine compound in the water-based solvent. For this reason, even in case of applying an aromatic polyimide precursor as the specific polyimide precursor, film-forming property is high, and environment suitability is excellent.

The polyimide precursor composition according to the embodiment (containing a nonionic surfactant as the surfactant) has excellent storage stability (hereinafter, also referred to as "pot life"). The reason for this is not clear, but is considered to be as follows.

First, in the polyimide precursor composition according to the embodiment, when an organic amine compound is dissolved in a water-based solvent, the specific polyimide precursor (the carboxyl group thereof) becomes an amine-salified state by an amine compound. For this reason, the solubility of the specific polyimide precursor with respect to a water-based solvent is increased, and the polyimide precursor composition including an organic amine compound has high film-forming properties, and is suitable for a composition for forming the polyimide molded body.

However, in the polyimide precursor composition, by aggregation of the molecular chains of the polyimide precursor, viscosity variation, or gelation tends to easily occur over time. In particular, when the solid content of the polyimide precursor is increased, this phenomenon easily occurs.

In contrast, when a nonionic surfactant is dissolved in a water-based solvent with an organic amine compound, the nonionic surfactant slowly modifies the specific polyimide precursor by a hydrogen bond with the carboxyl group of the specific polyimide precursor. For this reason, aggregation of the molecular chains of the specific polyimide precursor is suppressed, and viscosity variation or gelation is less likely to occur.

Therefore, it is estimated that the polyimide precursor composition according to the embodiment has excellent storage stability. Furthermore, it is estimated that even when the solid content of the specific polyimide precursor is increased, the storage stability is excellent.

Then, the polyimide molded body molded using the polyimide precursor composition according to the embodiment has high surface smoothness. In addition, various characteristics such as mechanical properties, the heat resistance, electrical characteristics, and solvent resistance are also high. In addition, since the polyimide precursor composition has excellent storage stability, the coating performance of the polyimide precursor composition is easily maintained highly, and variation in quality of the polyimide molded body is also suppressed.

In the polyimide precursor composition according to the embodiment, since the specific polyimide precursor, the organic amine compound, and the nonionic surfactant are dissolved in a water-based solvent, when molding the polyimide molded body, corrosion of the substrate which is a base is suppressed. It is considered that this is because the acidity of the carboxyl group in the specific polyimide precursor is suppressed by the basicity of the organic amine compound which coexists.

In the polyimide precursor composition according to the embodiment, when the specific polyimide precursor (for example, a resin synthesized from an aromatic tetracarboxylic dianhydride and an aromatic diamine compound) in which A represents a tetravalent aromatic organic group and B represents a divalent aromatic organic group in the general formula (I) is applied, usually, there is a tendency that the specific polyimide precursor is not easily dissolved in a solvent, and thus, a water-based solvent is applied as a solvent, and the specific polyimide precursor is dissolved in the state in which the specific polyimide precursor is salified by the organic amine compound in the water-based solvent. For this reason, even in case of applying an aromatic polyimide precursor as the specific polyimide precursor, film-forming properties is high, and environment suitability is excellent.

In the polyimide precursor composition according to the embodiment, a water-based solvent including water is applied as a solvent. Therefore, the polyimide precursor composition according to the embodiment has excellent environment suitability. In addition, when molding a polyimide molded body using the polyimide precursor composition according to the embodiment, reduction of the heating temperature for distilling off the solvent and shortening of the heating time are realized.

In the polyimide precursor composition according to the embodiment, since a water-based solvent including water is applied as a solvent, an aprotic polar solvent is not included as a solvent, or the amount thereof is reduced.

Moreover, the aprotic polar solvent is a solvent of which the boiling point is 150° C. or higher and 300° C. or lower, and the dipole moment is 3.0 D or greater and 5.0 D or less. Specific examples of the aprotic polar solvent include N-methyl-2-pyrrolidone (NMP), N,N-dimethylformamide (DMF), N,N-dimethylacetamide (DMAc), dimethyl sulfoxide (DMSO), hexamethylene phosphoramide (HMPA), N-methyl caprolactam, and N-acetyl-2-pyrrolidone.

The aprotic polar solvent represented by N-methyl-2-pyrrolidone (NMP) has the high boiling point of 150° C. or higher, and even after a drying step in the manufacture of a polyimide molded body, the solvent in the composition largely remains in the molded body. When this aprotic polar solvent remains in the polyimide molded body, reorientation of the polymer chains of the polyimide precursor occurs, by this, packing property of the polymer chains is impaired, and therefore, reduction in the mechanical strength of the obtained polyimide molded body occurs.

In contrast, by not including the aprotic polar solvent in the solvent or reducing the amount thereof, even in the obtained polyimide molded body, the aprotic polar solvent is not included, or the amount thereof is reduced. As a result, in the polyimide molded body by the polyimide precursor composition according to the embodiment, reduction in the mechanical strength is suppressed.

Then, by not including the aprotic polar solvent in the solvent or reducing the amount thereof, a polyimide resin molded body having excellent various characteristics such as the heat resistance, electrical characteristics, and solvent resistance in addition to the mechanical strength can be easily obtained.

In the polyimide precursor composition according to the embodiment, the specific polyimide precursor as the polyimide precursor is not a low molecular weight compound and does not have a structure having solubility improved in a solvent by lowering the interaction between polymer chains by introducing a bended chain or an aliphatic cyclic structure to the primary structure, a water-based solvent as the solvent is applied to the specific polyimide precursor, and the specific polyimide precursor (the carboxyl group thereof) is salified by the organic amine compound and the surfactant, and dissolved. For this reason, the water-solubilization of the polyimide precursor is achieved without causing depolymerization of the polyimide precursor found in a method for improving the solubility and reduction in the mechanical strength of the polyimide molded body caused by the molecular structural modification of the polyimide precursor in the polyimide precursor resin in the related art.

Hereinafter, each component of the polyimide precursor composition according to the embodiment will be described.

(Specific Polyimide Precursor)

The specific polyimide precursor is a resin (polyamic acid) having a repeating unit represented by the general formula (I). Moreover, the imidization ratio of the specific polyimide precursor may be 0.2 or less.

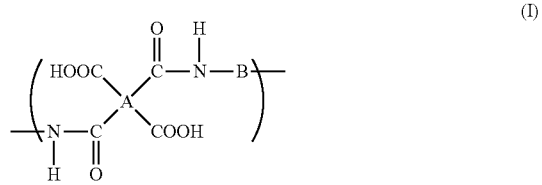

(In the general formula (I), A represents a tetravalent organic group, and B represents a divalent organic group.)

Here, in the general formula (I), the tetravalent organic group represented by A is the residue obtained by removing four carboxyl groups from tetracarboxylic dianhydride which is used as a raw material.

On the other hand, the divalent organic group represented by B is the residue obtained by removing two amino groups from a diamine compound which is used as a raw material.

That is, a specific polyimide precursor having a repeating unit represented by the general formula (I) is a polymer obtained by polymerization of tetracarboxylic dianhydride and a diamine compound.

As the tetracarboxylic dianhydride, any compound of aromatic compounds and aliphatic compounds can be exemplified, and the aromatic compounds are preferable. That is, in the general formula (I), the tetravalent organic group represented by A is preferably an aromatic organic group.

Examples of the aromatic tetracarboxylic acid include pyromellitic dianhydride, 3,3',4,4'-benzophenone tetracarboxylic dianhydride, 3,3',4,4'-biphenylsulfone tetracarboxylic dianhydride, 1,4,5,8-naphthalene tetracarboxylic dianhydride, 2,3,6,7-naphthalene tetracarboxylic dianhydride, 3,3',4,4'-biphenylether tetracarboxylic dianhydride, 3,3',4,4'-dimethyl diphenyl silane tetracarboxylic dianhydride, 3,3',4,4'-tetraphenyl silane tetracarboxylic dianhydride, 1,2,3,4-furan tetracarboxylic dianhydride, 4,4'-bis(3,4-dicarboxyphenoxy)diphenylsulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidene phthalic dianhydride, 3,3',4,4'-biphenyltetracarboxylic dianhydride, 2,3,3',4'-biphenyltetracarboxylic dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenylether dianhydride, and bis(triphenylphthalic acid)-4,4-diphenylmethane dianhydride.

Examples of the aliphatic tetracarboxylic dianhydride include aliphatic or alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbonane-2-acetic dianhydride, 2,3,4,5-tetrahydrofurantetracarboxylic dianhydride, 5-(2,5-dioxotetrahydrofural)-3-methyl-3-cyclohexene-1,2-dicarboxylic dianhydride, and bicyclo[2,2,2]-oct-7-en-2,3,5,6-tetracarboxylic dianhydride; and aliphatic tetracarboxylic dianhydride having an aromatic ring such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naptho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Among these, as the tetracarboxylic dianhydride, aromatic tetracarboxylic dianhydride is preferable, and specifically, for example, pyromellitic dianhydride, 3,3',4,4'-biphenyltetracarboxylic dianhydride, 2,3,3',4'-biphenyltetracarboxylic dianhydride, 3,3',4,4'-biphenylether tetracarboxylic dianhydride, and 3,3',4,4'-benzophenone tetracarboxylic dianhydride are preferable, pyromellitic dianhydride, 3,3',4,4'-biphenyltetracarboxylic dianhydride, and 3,3',4,4'-benzophenone tetracarboxylic dianhydride are more preferable, and 3,3',4,4'-biphenyltetracarboxylic dianhydride are particularly preferable.

Moreover, the tetracarboxylic dianhydride may be used alone or two or more kinds may be used in combination.

In addition, in a case where two or more types are used in combination, each of an aromatic tetracarboxylic acid or an aliphatic tetracarboxylic acid may be used in combination, or an aromatic tetracarboxylic acid and an aliphatic tetracarboxylic acid may be combined.

On the other hand, the diamine compound is a diamine compound having two amino groups in the molecular structure. As the diamine compound, any compound of aromatic compounds and aliphatic compounds can be exemplified, and the aromatic compounds are preferable. That is, in the general formula (I), the divalent organic group represented by B is preferably an aromatic organic group.

Examples of the diamine compound include aromatic diamines such as p-phenylene diamine, m-phenylene diamine, 4,4'-diaminodiphenyl methane, 4,4'-diaminodiphenyl ethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyl, 5-amino-1-(4'-aminophenyl)-1,3,3-trimethylindan, 6-amino-1-(4'-aminophenyl)-1,3,3-trimethylindan, 4,4'-diaminobenzanilide, 3,5-diamino-3'-trifluoromethyl benzanilide, 3,5-diamino-4'-trifluoromethyl benzanilide, 3,4'-diaminodiphenyl ether, 2,7-diaminofluorene, 2,2-bis(4-aminophenyl)hexafluoropropane, 4,4'-methylene-bis(2- chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxyl)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenylene isopropylidene)bisaniline, 4,4'-(m-phenylene isopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having a hetero atom other than two amino groups bonded to the aromatic ring such as diaminotetraphenylthiophene and a nitrogen atom of the amino group; and aliphatic diamines and alicyclic diamines such as 1,1-metaxylylene diamine, 1,3-propane diamine, tetramethylene diamine, pentamethylene diamine, octamethylene diamine, nonamethylene diamine, 4,4-diaminoheptamethylene diamine, 1,4-diaminocyclohexane, isophorone diamine, tetrahydrodicyclopentadienylene diamine, hexahydro-4,7-methanoindanylenedimethylene diamine, tricyclo [6,2,1,0$^{2,7}$]-undecylenedimethyl diamine, and 4,4'-methylene bis(cyclohexylamine).

Among these, as the diamine compound, aromatic diamine compounds are preferable, and specifically, for example, p-phenylene diamine, m-phenylene diamine, 4,4'-diaminodiphenyl methane, 4,4'-diaminodiphenyl ether, 3,4'-diaminodiphenyl ether, 4,4'-diaminodiphenyl sulfide, and 4,4'-diaminodiphenyl sulfone are preferable, and 4,4'-diaminodiphenyl ether and p-phenylenediamine are particularly preferable.

Moreover, the diamine compound may be used alone or two or more kinds may be used in combination. In addition, in a case where two or more types are used in combination, each of an aromatic diamine compound or an aliphatic diamine compound may be used in combination, or an aromatic diamine compound and an aliphatic diamine compound may be combined.

A specific polyimide precursor may be a resin having the imidation ratio of 0.2 or less. That is, the specific polyimide precursor may be a resin of which a part is imidized.

Specifically, as the specific polyimide precursor, a resin having a repeating unit represented by the general formula (I-1), (I-2), or (I-3) can be exemplified.

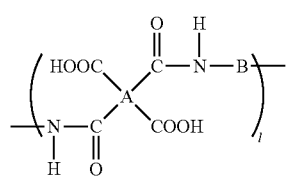
(I-1)

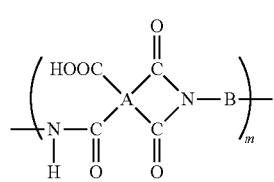
(I-2)

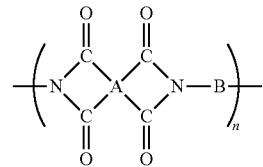
(I-3)

In the general formulas (I-1), (I-2), and (I-3), A represents a tetravalent organic group, and B represents a divalent organic group. Moreover, A and B have the same definition as A and B in the general formula (I).

l represents an integer of 1 or greater, each of m and n independently represents an integer of 0 or 1 or greater, and a relationship of $(2n+m)/(2l+2m+2n) \leq 0.2$ is satisfied.

In the general formulas (I-1) to (I-3), l represents an integer of 1 or greater, preferably represents an integer of 1 or greater and 200 or less, and more preferably represents an integer of 1 or greater and 100 or less. Each of m and n independently represents an integer of 0 or 1 or greater, preferably independently represents an integer of 0 or 1 or greater and 200 or less, and more preferably represents an integer of 0 or 1 or greater and 100 or less.

Then, l, m, and n satisfy a relationship of $(2n+m)/(2l+2m+2n) \leq 0.2$, preferably a relationship of $(2n+m)/(2l+2m+2n) \leq 0.15$, and more preferably a relationship of $(2n+m)/(2l+2m+2n) \leq 0.10$.

Here, "$(2n+m)/(2l+2m+2n)$" shows a ratio of the number of the binding part, $(2n+m)$, which is imide ring-opened with respect to the number of the total binding parts, $(2l+2m+2n)$ in the binding part (reaction part of tetracarboxylic dianhydride and a diamine compound) of a specific polyimide precursor. That is, "$(2n+m)/(2l+2m+2n)$" shows an imidization ratio of the specific polyimide precursor.

Then, when the imidization ratio (a value of "$(2n+m)/(2l+2m+2n)$") of the specific polyimide precursor is 0.2 or less (preferably 0.15 or less and more preferably 0.10 or less), occurrence of gelation or separation by precipitation of the specific polyimide precursor is suppressed.

The imidization ratio (a value of "$(2n+m)/(2l+2m+2n)$") of the specific polyimide precursor is measured by the following method.

—Measurement of Imidization Ratio of Polyimide Precursor—

Preparation of Polyimide Precursor Sample (i) A polyimide precursor composition which is the measurement target is coated with a thickness in a range of 1 μm or greater and 10 μm or less on a silicon wafer, whereby a coating film sample is prepared.

(ii) By immersing the coating film sample in tetrahydrofuran (THF) for 20 minutes, the solvent in the coating film sample is substituted with tetrahydrofuran (THF). The solvent for immersing is not limited to THF, and can be selected from solvents which do not dissolve the polyimide precursor, and can be mixed with the solvent component included in the polyimide precursor composition.

Specifically, alcohol solvents such as methanol and ethanol, and ether compounds such as dioxane can be used.

(iii) The coating film sample is taken out from THF, and N$_2$ gas is blown to THF adhered to the surface of the coating film sample, whereby THF adhered to the surface of the coating film sample is removed. The coating film sample is dried by being treating for 12 hours or more at a range of 5°

C. or higher and 25'C or lower under a reduced pressure of 10 mmHg or lower, whereby a polyimide precursor sample is prepared.

Preparation of 100% Imidized Standard Sample (iv) In the same manner as in (1) described above, a polyimide precursor composition which is the measurement target is coated on a silicon wafer, whereby a coating film sample is prepared.

(v) An imidization reaction is performed by heating the coating film sample at 380° C. for 60 minutes, whereby 100% imidized standard sample is prepared.

Measurement and Analysis (Measurement Example and Analysis Example of the Polyimide Precursor Sample Consisting of 4,4'-diaminodiphenyl ether and 3,3'4,4'-biphenyltetracarboxylic dianhydride)

(vi) Using a Fourier transform infrared spectrophotometer (FT-730, manufactured by Horiba, Ltd.), infrared absorption spectra of the 100% imidized standard sample and the polyimide precursor sample are measured. A ratio I'(100) of an absorption peak (Ab'(1780 cm$^{-1}$)) derived from an imide bond near 1780 cm$^{-1}$ with respect to an absorption peak (Ab'(1500 cm$^{-1}$)) derived from an aromatic ring near 1500 cm$^{-1}$ of the 100% imidized standard sample is obtained.

(vii) In the same manner, the measurement is performed on the polyimide precursor sample, and a ratio I(x) of an absorption peak (Ab (1780 cm$^{-1}$)) derived from an imide bond near 1780 cm$^{-1}$ with respect to an absorption peak (Ab (1500 cm$^{-1}$)) derived from an aromatic ring near 1500 cm$^{-1}$ is obtained.

Then, using each of the measured absorption peaks I'(100) and I(x), the imidization ratio of the polyimide precursor is calculated based on the following formula.

Imidization ratio of polyimide precursor=$I(x)/I'(100)$     Formula:

$I'(100)=(Ab'(1780\ cm^{-1}))/(Ab'(1500\ cm^{-1}))$     Formula:

$I(x)=(Ab(1780\ cm^{-1}))/(Ab(1500\ cm^{-1}))$     Formula:

Moreover, the measurement of the imidization ratio of the polyimide precursor is applied to the measurement of the imidization ratio of the aromatic polyimide precursor. In a case of measuring the imidization ratio of the aliphatic polyimide precursor, a peak derived from a structure which is not changed before and after the imidization reaction is used as an internal standard peak, instead of the absorption peak of the aromatic ring.

—Terminal Amino Group of Polyimide Precursor—

The specific polyimide precursor may include a polyimide precursor (resin) having an amino group at a terminal, and is preferably a polyimide precursor having amino groups at the entire terminals.

To provide an amino group at the molecular terminal of the polyimide precursor, for example, much more molar equivalent of the diamine compound used in the polymerization reaction than the molar equivalent of tetracarboxylic dianhydride is added. The ratio of a molar equivalent of a diamine compound and tetracarboxylic dianhydride is preferably in a range of 1.0001 or greater and 1.2 or less, and more preferably in a range of 1.001 or greater and 1.2 or less with respect to 1 molar equivalent of tetracarboxylic acid.

When the ratio of the molar equivalent of a diamine compound and tetracarboxylic dianhydride is 1.0001 or greater, effects of the amino group at the molecular terminal are large, and excellent dispersibility can be obtained. In addition, when the ratio of the molar equivalent is 1.2 or less, the molecular weight of the polyimide precursor obtained is large, and for example, when a polyimide molded body has a film shape, sufficient film strength (tear strength and tensile strength) is easily obtained.

The terminal amino group of the specific polyimide precursor is detected by making trifluoroacetic anhydride (quantitatively reacts to the amino group) act to the polyimide precursor composition. That is, the terminal amino group of the specific polyimide precursor is amidated by trifluoroacetic acid. After the treatment, by purifying the specific polyimide precursor by reprecipitation or the like, the excessive trifluoroacetic anhydride and trifluoroacetic acid residue are removed. By determining the quantity of the specific polyimide precursor after the treatment by a nuclear magnetic resonance (NMR) method, the amount of the terminal amino group of the specific polyimide precursor is measured.

The number average molecular weight of the specific polyimide precursor is preferably 1000 or greater and 100000 or less, more preferably 5000 or greater and 50000 or less, and further more preferably 10000 or greater and 30000 or less.

When the number average molecular weight of the specific polyimide precursor is in the above range, decrease in the solubility of the specific polyimide precursor with respect to a solvent is suppressed, and the film-forming properties are easily secured. In particular, in a case of applying the specific polyimide precursor including a resin having an amino group at the terminal, when the molecular weight is low, the presence ratio of the terminal amino group is increased, and the solubility is easily reduced by the influence of the organic amine compound which coexists in the polyimide precursor composition. When the number average molecular weight of the specific polyimide precursor is in the above range, decrease in the solubility can be suppressed.

Moreover, by adjusting the ratio of the molar equivalent of tetracarboxylic dianhydride and a diamine compound, the specific polyimide precursor having the number average molecular weight intended is obtained.

The number average molecular weight of the specific polyimide precursor is measured by a gel permeation chromatography (GPC) under the following measurement conditions.

Column: TSKgel α-M manufactured by Tosoh Corporation (7.8 mm I.D×30 cm)

Eluent: DMF (dimethylformamide)/30 mM LiBr/60 mM phosphoric acid

Flow rate: 0.6 mL/min

Injection amount: 60 μl

Detector: RI (refractive index detector)

The content (concentration) of the specific polyimide precursor is preferably 0.1% by mass or greater and 40% by mass or less, more preferably 0.5% by mass or greater and 25% by mass or less, and further more preferably 1% by mass or greater and 20% by mass or less with respect to the total polyimide precursor compositions.

(Organic Amine Compound)

The organic amine compound is a compound which increases the solubility with respect to the solvent by an amine salification of the specific polyimide precursor (the carboxyl group thereof) and functions as an imidization accelerator. The organic amine compound is an amine compound of nonsurface activity having no surface activity. Specifically, the organic amine compound is preferably an amine compound having a molecular weight of 170 or less.

Moreover, the organic amine compound is preferably a water-soluble compound. Here, "water-soluble" means that 1% by mass or greater of the object substance dissolves with respect to water, at 25° C.

Examples of the organic amine compound include a primary amine compound, a secondary amine compound, and a tertiary amine compound.

Among these, as the organic amine compound, at least one kind (in particular, the tertiary amine compound) selected from the secondary amine compound and the tertiary amine compound is preferable. When as the organic amine compound, the tertiary amine compound or the secondary amine compound is applied (in particular, the tertiary amine compound), the solubility of the specific polyimide precursor with respect to a solvent is easily increased, the film-forming properties are easily improved, and storage stability of the polyimide precursor composition is easily improved.

In addition, examples of the organic amine compound include a bivalent or higher polyvalent amine compound in addition to a monovalent amine compound. When a bivalent or higher polyvalent amine compound is applied, a pseudo-crosslinked structure is easily formed between the specific polyimide precursor molecules, and storage stability of the polyimide precursor composition is easily improved.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamino)ethanol, 2-(ethylamino) ethanol, and morpholine.

Examples of the tertiary amine compound include 2-dimethyl amino ethanol, 2-diethylamino ethanol, 2-dimethyl amino propanol, triethylamine, picoline, methylmorpholine, and ethyl morpholine.

Examples of the polyvalent amine compound include isoquinolines (amine compounds having an isoquinoline skeleton), pyridines (amine compounds having a pyridine skeleton), pyrimidines (amine compounds having a pyrimidine skeleton), pyrazines (amine compounds having a pyrazine skeleton), piperazines (amine compounds having a piperazine skeleton), triazines (amine compounds having a triazine skeleton), imidazoles (amine compounds having an imidazole skeleton), polyaniline, polypyridine, and polyamine.

Among these, as the organic amine compound, a compound having the boiling point of 60° C. or higher (more preferable, 60° C. or higher and 200° C. or lower, and further more preferably 70° C. or higher and 150° C. or lower) is preferable. When the boiling point of the organic amine compound is 60° C. or higher, at the time of storage, volatilization of the organic amine compound from the polyimide precursor composition is suppressed, and decrease in the solubility of the specific polyimide precursor with respect to a solvent is easily suppressed.

The organic amine compound is contained preferably by 30 mol % or greater and 500 mol % or less, more preferably 50 mol % or greater and 500 mol % or less, more preferably 50 mol % or greater and 250 mol % or less, more preferably 80 mol % or greater and 250 mol % or less, and further more preferably 70 mol % or greater and 200 mol % or less, further more preferably 100 mol % or greater and 200 mol % or less, with respect to the carboxyl group included in the specific polyimide precursor.

When the content of the organic amine compound is in the above range, the solubility of the specific polyimide precursor with respect to a solvent is easily increased, and the film-forming properties are easily improved. In addition, storage stability of the polyimide precursor composition is also easily improved.

(Surfactant)

Here, as the surfactant, for example, a cationic surfactant, an anionic surfactant, and a nonionic surfactant can be exemplified.

The surfactant is preferably contained by 0.0001% by mass or greater and 0.5% by mass or less, more preferably contained by 0.001% by mass or greater and 0.1% by mass or less, and further more preferably contained by 0.005% by mass or greater and 0.05% by mass or less with respect to the total polyimide precursor resin compositions.

(Cationic Surfactant)

A cationic surfactant is a compound having a cationic hydrophilic group, and having surface activity.

Examples of the cationic surfactant include known surfactants such as amine salts, quaternary ammonium salts, pyridinium salts, and imidazolinium salts. Specifically, as the cationic surfactants, a surfactant having a molecular weight of 200 or greater without an organic group (for example, an alkyl chain, an alkenyl chain, and the like) having 30 or more carbon atoms is preferable. That is, as the cationic surfactants, a surfactant having a molecular weight of 200 or greater with an organic group (for example, an alkyl chain, an alkenyl chain, and the like) having carbon atoms less than 30 is preferable.

As the cationic surfactant, in particular, a quaternary ammonium salt represented by the following general formula (II) is preferable from the viewpoint of storage stability and reduction of odor.

In the general formula (II), X represents a chlorine atom or a bromine atom, and each of $R^1$, $R^2$, $R^3$, and $R^4$ independently represents an organic group having 1 to 22 carbon atoms.

In the general formula (II), as the organic group represented by $R^1$, $R^2$, $R^3$, and $R^4$, a substituted or unsubstituted alkyl group having 1 to 22 carbon atoms, and a substituted or unsubstituted alkenyl group having 1 to 22 carbon atoms can be exemplified.

Here, in the general formula (II), from the viewpoint of storage stability and reduction of odor, at least one of $R^1$, $R^2$, $R^3$, and $R^4$ is preferably an organic group having 8 to 22 carbon atoms (hereinafter, referred to as "high carbon number organic group") and the residue is preferably an organic group having 1 to 6 carbon atoms (hereinafter, referred to as "low carbon number organic group"). Specifically, one or two of $R^1$, $R^2$, $R^3$, and $R^4$ are preferably a high carbon number organic group, and the residue is preferably a low carbon number organic group.

Examples of the high carbon number organic group include a substituted or unsubstituted alkyl group having 8 to 22 carbon atoms, and a substituted or unsubstituted alkenyl group having 8 to 22 carbon atoms.

As the unsubstituted alkyl group having 8 to 22 carbon atoms, an alkyl group having 10 to 22 carbon atoms is preferable, and an alkyl group having 12 to 22 carbon atoms is more preferable. The unsubstituted alkyl group having 8 to 22 carbon atoms may be any one of a linear shape, a branched shape, and a cyclic shape. A linear shape, or a branched shape is preferable, and a linear shape is more preferable.

As the unsubstituted alkenyl group having 8 to 22 carbon atoms, an alkenyl group having 10 to 22 carbon atoms is preferable, and an alkenyl group having 12 to 22 carbon atoms is more preferable. The alkenyl group is preferably a group having one or two double bonds in carbon-carbon bonds. The alkenyl group may be any one of a linear shape, a branched shape, and a cyclic shape. A linear shape, or a branched shape is preferable, and a linear shape is more preferable.

Examples of the low carbon number organic group include a substituted or unsubstituted alkyl group having 1 to 6 carbon atoms.

As the unsubstituted alkyl group having 1 to 6 carbon atoms, an alkyl group having 1 to 4 carbon atoms is preferable, and an alkyl group having 1 to 2 carbon atoms is more preferable. The unsubstituted alkyl group having 1 to 6 carbon atoms may be any one of a linear shape and a branched shape, and a linear shape is preferable.

Moreover, as the substituent which substitutes the alkyl group and the alkenyl group, an aryl group (for example, a phenyl group, and the like) can be exemplified.

In particular, as the quaternary ammonium salt represented by the general formula (II), a quaternary ammonium salt in which X represents Cl, $R^1$ represents an n-dodecyl group, $R^2$ represents a methyl group, $R^3$ represents a methyl group, and $R^4$ represents a methyl group is preferable.

Specific examples of the quaternary ammonium salt represented by the general formula (II) include alkyl trimethyl ammonium salts such as lauryl trimethyl ammonium chloride, stearyl trimethyl ammonium chloride, behenyl trimethyl ammonium chloride, and hexadecyl trimethyl ammonium chloride; dialkyl dimethyl ammonium salts such as distearyl dimethyl ammonium chloride, dioleyl dimethyl ammonium chloride, and didecyl dimethyl ammonium chloride; alkyl dimethyl benzyl ammonium salts such as alkyl benzyl dimethyl ammonium chloride (benzalkonium chloride), benzyl trimethyl ammonium chloride, benzyl triethyl ammonium chloride, and benzyl tributyl ammonium chloride; and trimethyl phenyl ammonium chloride. However, the present invention is not limited thereto.

The molecular weight of the cationic surfactant is preferably 200 or greater, more preferably 250 or greater, and further more preferably 300 or greater from the viewpoint of storage stability and reduction of odor.

The cationic surfactant is preferably contained by 0.0001% by mass or greater and 0.5% by mass or less, more preferably contained by 0.001% by mass or greater and 0.1% by mass or less, and further more preferably contained by 0.005% by mass or greater and 0.05% by mass or less with respect to the total polyimide precursor resin compositions.

When the content of the cationic surfactant is in the above range, the storage stability is easily increased, and the odor is easily reduced.

Here, the ratio of the organic amine compound and the cationic surfactant (mass ratio: organic amine compound/cationic surfactant) is preferably 2/1 or greater and 30/1 or less, more preferably 5/1 or greater and 25/1 or less, and further more preferably 10/1 or greater and 20/1 or less from the viewpoint of storage stability and reduction of odor of the polyimide precursor composition.

(Anionic Surfactant)

An anionic surfactant is a compound having an anionic hydrophilic group, and having surface activity.

As the anionic surfactant, known surfactants such as fatty acid salt, alkyl sulfate, alkenyl sulfate, polyoxyalkylene alkyl ether sulfate, polyoxyalkylene alkenyl ether sulfate, alkyl aryl sulfonate, alkenyl aryl sulfonate, polyoxyalkylene alkyl ether phosphate, and polyoxyalkylene alkenyl ether phosphate can be exemplified.

As the anionic surfactant, in particular, at least one type selected from a group consisting of surfactants represented by the following general formula (III-1), (III-2), (III-3), or (III-4) is preferable from the viewpoint of reduction of odor.

(III-1)

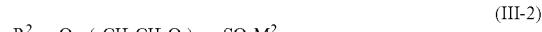
(III-2)

(III-3)

(III-4)

In the general formulas (III-1) to (III-4), each of $R^1$, $R^2$, $R^3$, and $R^4$ independently represents a substituted or unsubstituted organic group having 8 or more carbon atoms. Each of $M^1$, $M^2$, $M^3$, and $M^4$ independently represents an alkali metal ion, an ammonium ion, or a substituted ammonium ion. Each of n2 and n4 independently represents an integer of 1 or greater and 10 or less.

In the general formulas (III-1) to (III-4), as the organic group represented by $R^1$, $R^2$, $R^3$, and $R^4$, a substituted or unsubstituted alkyl group having 8 to 22 carbon atoms, a substituted or unsubstituted alkenyl group having 8 to 22 carbon atoms, and a substituted or unsubstituted aryl group having 8 to 28 carbon atoms can be exemplified.

As the unsubstituted alkyl group having 8 to 22 carbon atoms, an alkyl group having 10 to 22 carbon atoms is preferable, and an alkyl group having 12 to 22 carbon atoms is more preferable. The unsubstituted alkyl group having 8 to 22 carbon atoms may be any one of a linear shape, a branched shape, and a cyclic shape. A linear shape, or a branched shape is preferable, and a linear shape is more preferable.

As the unsubstituted alkenyl group having 8 to 22 carbon atoms, an alkenyl group having 10 to 22 carbon atoms is preferable, and an alkenyl group having 12 to 22 carbon atoms is more preferable. The alkenyl group is preferably a group having one or two double bonds in carbon-carbon bonds. The alkenyl group may be any one of a linear shape, a branched shape, and a cyclic shape. A linear shape, or a branched shape is preferable, and a linear shape is more preferable.

Moreover, as the substituent which substitutes the alkyl group and the alkenyl group, an aryl group (for example, a phenyl group, and the like) and the like can be exemplified.

In the general formulas (III-1) to (III-4), as the alkali metal ion represented by $M^1$, $M^2$, $M^3$, and $M^4$, $Na^+$, $K^+$, and the like can be exemplified. As the substituted ammonium ion represented by $M^1$, $M^2$, $M^3$, and $M^4$, a protonated adduct of alkanolamine (for example, $NH(CH_2CH_2OH)_3^+$ and the like) can be exemplified.

In the general formulas (III-1) to (III-4), n2 and n4 preferably represent an integer of 1 or greater and 10 or less.

In particular, as the surfactant represented by the general formula (III-1), surfactants in which $R^1$ represents a substituted or unsubstituted alkyl group having 8 to 22 carbon atoms, or a substituted or unsubstituted alkenyl group having 8 to 22 carbon atoms, and $M^1$ represents an alkali metal ion, an ammonium ion, or a substituted ammonium ion are preferable.

As the surfactant represented by the general formula (III-2), surfactants in which $R^2$ represents a substituted or unsubstituted alkyl group having 8 to 22 carbon atoms, or a substituted or unsubstituted alkenyl group having 8 to 22 carbon atoms, $M^2$ represents an alkali metal ion, an ammonium ion, or a substituted ammonium ion, and n2 represents an integer of 1 or greater and 10 or less are preferable.

As the surfactant represented by the general formula (III-3), surfactants in which $R^3$ represents a substituted or unsubstituted alkyl group having 8 to 22 carbon atoms, or a substituted or unsubstituted alkenyl group having 8 to 22 carbon atoms, and $M^3$ represents an alkali metal ion are preferable.

As the surfactant represented by the general formula (III-4), surfactants in which $R^4$ represents a substituted or unsubstituted alkyl group having 8 to 22 carbon atoms, or a substituted or unsubstituted alkenyl group having 8 to 22 carbon atoms, $M^4$ represents an alkali metal ion, an ammonium ion, or a substituted ammonium ion, and n4 represents an integer of 1 or greater and 10 or less are preferable.

Specific examples of the surfactant represented by the general formula (III-1) include sodium lauryl sulfate, ammonium lauryl sulfate, sodium dodecylbenzenesulfonate, triethanolamine lauryl sulfate, and monoethanolamine 2-ethyl benzyl sulfate.

Specific examples of the surfactant represented by the general formula (III-2) include sodium polyoxyethylene lauryl ether sulfate, triethanolamine polyoxyethylene lauryl sulfate, and polyoxyethylene castor oil ether sulfate salt.

Specific examples of the surfactant represented by the general formula (Ill-3) include potassium oleate, sodium stearate, and castor oil potassium.

Specific examples of the surfactant represented by the general formula (III-4) include potassium polyoxyethylene alkyl ether phosphate and polyoxyethylene alkyl ether phosphate.

Here, the specific examples of the surfactant are not limited thereto.

The molecular weight of the anionic surfactant is preferably 200 or greater, more preferably 250 or greater, and further more preferably 300 or greater from the viewpoint of reduction of odor. Here, in a case where the anionic surfactant is a low molecular weight compound, the molecular weight of the anionic surfactant is preferably 450 or less. On the other hand, in a case where the anionic surfactant is a high molecular weight compound, the molecular weight of the anionic surfactant is preferably 1000 or less.

Moreover, the molecular weight of the anionic surfactant is the weight average molecular weight. The measurement method of the weight average molecular weight is as follows.

The weight average molecular weight of the anionic surfactant was measured by a gel permeation chromatography (GPC) under the following measurement conditions.

Column: TSKgel α-M manufactured by Tosoh Corporation (7.8 mm I.D×30 cm)
Eluent: $CH_3CN$/water=50/50
Flow rate: 0.5 mL/min
Injection amount: 10 μl
Detector: RI (refractive index detector)

The anionic surfactant is preferably contained by 0.0001% by mass or greater and 0.5% by mass or less, more preferably contained by 0.001% by mass or greater and 0.1% by mass or less, and further more preferably contained by 0.005% by mass or greater and 0.05% by mass or less with respect to the total polyimide precursor resin compositions.

When the content of the anionic surfactant is in the above range, the odor is easily reduced.

(Nonionic Surfactant)

A nonionic surfactant is a compound which does not exhibit ionicity when being dissolved in a solvent and has surface activity.

Examples of the nonionic surfactant include known surfactants such as polyoxyalkylene alkyl ether, polyoxyalkylene alkenyl ether, polyoxyalkylene alkyl phenyl ether, polyoxyalkylene alkenyl phenyl ether, fatty acid ester, fatty acid diester, polyoxyalkylene fatty acid ester, polyoxyalkylene fatty acid diester, sugar ester, polyalkylene adduct of sugar ester, and alkanolamide.

As the nonionic surfactant, in particular, at least one type selected from a group consisting of surfactants represented by the following general formula (IV-1), (IV-2), (IV-3), or (IV-4) is preferable from the viewpoint of storage stability.

(IV-1)

(IV-2)

(IV-3)

(IV-4)

In the general formulas (IV-1) to (IV-4), each of $R^1$, $R^2$, $R^3$, and $R^4$ independently represents a substituted or unsubstituted organic group having 8 or more carbon atoms. Each of $A^3$ and $A^4$ independently represents a polysaccharide. Each of n1, n2, and n4 independently represents an integer of 1 to 10. m4 represents an integer of 1 to 5.

In the general formula (IV), as the organic group represented by $R^1$, $R^2$, $R^3$, and $R^4$, a substituted or unsubstituted alkyl group having 8 to 22 carbon atoms, a substituted or unsubstituted alkenyl group having 8 to 22 carbon atoms, a substituted or unsubstituted alkyl phenyl group having 8 to 22 carbon atoms, a substituted or unsubstituted alkenyl phenyl group having 8 to 22 carbon atoms, and a substituted or unsubstituted aryl group having 8 to 22 carbon atoms can be exemplified.

As the unsubstituted alkyl group having 8 to 22 carbon atoms, an alkyl group having 10 to 22 carbon atoms is preferable, and an alkyl group having 12 to 22 carbon atoms is more preferable. The unsubstituted alkyl group having 8 to 22 carbon atoms may be any one of a linear shape, a branched shape, and a cyclic shape. A linear shape, or a branched shape is preferable, and a linear shape is more preferable.

As the unsubstituted alkenyl group having 8 to 22 carbon atoms, an alkenyl group having 10 to 22 carbon atoms is preferable, and an alkenyl group having 12 to 22 carbon atoms is more preferable. The alkenyl group is preferably a group having one or two double bonds in carbon-carbon bonds. The alkenyl group may be any one of a linear shape, a branched shape, and a cyclic shape. A linear shape, or a branched shape is preferable, and a linear shape is more preferable.

Moreover, as the substituent which substitutes the alkyl group and the alkenyl group, an aryl group (for example, a phenyl group, and the like) and the like can be exemplified.

As the substituted or unsubstituted alkyl phenyl group having 8 to 22 carbon atoms, a phenyl group which is substituted with a substituted or unsubstituted alkyl group having 10 to 22 carbon atoms (preferably 12 to 22 carbon atoms) is preferable.

As the unsubstituted alkenyl phenyl group having 8 to 22 carbon atoms, a phenyl group which is substituted with a substituted or unsubstituted alkenyl group having 10 to 22 carbon atoms (preferably 12 to 22 carbon atoms) is preferable.

The alkyl group and alkenyl group substituted with a phenyl group may be any one of a linear shape, a branched shape, and a cyclic shape. A linear shape, or a branched shape is preferable, and a linear shape is more preferable. In addition, the unsubstituted alkenyl group is preferably a group having one or two double bonds in carbon-carbon bonds.

Moreover, as the substituent which substitutes the alkyl group and the alkenyl group to be substituted with a phenyl group, an aryl group (for example, a phenyl group, and the like) and the like can be exemplified.

In the general formulas (IV-1) to (IV-4), as the polysaccharide represented by $A^3$ or $A^4$, glycerol, polyglycerol, sorbitol, sorbitan, and sucrose can be exemplified. Among these, as the polysaccharide, sorbitan is preferable.

In the general formulas (IV-1) to (IV-4), n1, n2, and n4 represents preferably an integer of 1 to 10.

m4 preferably represents an integer of 1 to 5, and more preferably an integer of 1 to 3.

In particular, as the surfactant represented by the general formula (IV-1), surfactants in which $R^1$ represents a substituted or unsubstituted alkyl group having 8 to 22 carbon atoms, or a substituted or unsubstituted alkenyl group having 8 to 22 carbon atoms, and n1 represents an integer of 1 to 10 are preferable.

As the surfactant represented by the general formula (IV-2), surfactants in which $R^2$ represents a substituted or unsubstituted alkyl group having 8 to 22 carbon atoms, or a substituted or unsubstituted alkenyl group having 8 to 22 carbon atoms, and n2 represents an integer of 1 to 10 are preferable.

As the surfactant represented by the general formula (IV-3), surfactants in which $R^3$ represents a substituted or unsubstituted alkyl group having 8 to 22 carbon atoms, or a substituted or unsubstituted alkenyl group having 8 to 22 carbon atoms, and $A^3$ represents sorbitol or sorbitan are preferable.

As the surfactant represented by the general formula (IV-4), surfactants in which $R^4$ represents a substituted or unsubstituted alkyl group having 8 to 22 carbon atoms, or a substituted or unsubstituted alkenyl group having 8 to 22 carbon atoms, $A^4$ represents sorbitol or sorbitan, n4 represents an integer of 1 to 10, and m4 represents an integer of 3 are preferable.

Specific examples of the surfactant represented by the general formula (IV-1) include polyoxyethylene oleyl ether, polyoxyethylene lauryl ether, polyoxyethylene cetyl ether, polyoxyethylene stearyl ether, polyoxyethylene octyl dodecyl ether, polyoxyethylene myristyl ether, polyoxyethylene tribenzylphenyl ether, and polyoxyethylene distyrenated phenyl ether.

Specific examples of the surfactant represented by the general formula (IV-2) include polyethylene glycol monooleate, polyethylene glycol monolaurate, polyethylene glycol monostearate, and polyethylene glycol distearate.

Specific examples of the surfactant represented by the general formula (IV-3) include sorbitan monooleate, sorbitan monolaurate, sorbitan monopalmitate, sorbitan monostearate, sorbitan distearate, and sorbitan sesquioleate.

Specific examples of the surfactant represented by the general formula (IV-4) include polyoxyethylene sorbitan monolaurate, polyoxyethylene sorbitan monostearate, polyoxyethylene sorbitan tristearate, polyoxyethylene sorbitan monooleate, and polyoxyethylene triisostearate.

Here, the specific examples of the surfactant are not limited thereto.

The molecular weight of the nonionic surfactant is preferably 250 or greater, more preferably 300 or greater, and further more preferably 400 or greater from the viewpoint of the storage stability. Here, in a case where the nonionic surfactant is a low molecular weight compound, the molecular weight of the nonionic surfactant is preferably 500 or less. On the other hand, in a case where the nonionic surfactant is a high molecular weight compound, the molecular weight of the nonionic surfactant is preferably 1000 or less.

Moreover, the molecular weight of the nonionic surfactant is the weight average molecular weight. The measurement method of the weight average molecular weight is as follows.

The weight average molecular weight of the nonionic surfactant was measured by a gel permeation chromatography (GPC) under the following measurement conditions.

Column: TSKgel α-M manufactured by Tosoh Corporation (7.8 mm I.D×30 cm)
Eluent: $CH_3CN$/water=50/50
Flow rate: 0.5 mL/min
Injection amount: 10 μl
Detector: RI (refractive index detector)

The nonionic surfactant is preferably contained by 0.0001% by mass or greater and 0.5% by mass or less, more preferably contained by 0.001% by mass or greater and 0.1% by mass or less, and further more preferably contained by 0.005% by mass or greater and 0.05% by mass or less with respect to the total polyimide precursor compositions.

When the content of the nonionic surfactant is in the above range, the storage stability is easily increased.

Here, the ratio of the organic amine compound and the nonionic surfactant (mass ratio: organic amine compound/nonionic surfactant) is preferably 2/1 or greater and 30/1 or less, more preferably 5/1 or greater and 25/1 or less, and further more preferably 10/1 or greater and 20/1 or less from the viewpoint of the storage stability of the polyimide precursor composition.

(Water-Based Solvent)

The water-based solvent is a water-based solvent including water. The water-based solvent preferably contains water of at least 70% by mass or greater. Examples of the water include distilled water, ion exchange water, ultrafiltration water, and pure water.

In the water-based solvent, water is contained by 70% by mass or greater and 100% by mass or less, preferably by 80% by mass or greater and 100% by mass or less, and more preferably by 90% by mass or greater and 100% by mass or less, and solvents other than water are particularly preferably not contained.

Moreover, in a case where a solvent other than water is contained as the water-based solvent, for example, a water-soluble organic solvent can be suitably used.

Examples of the water-soluble organic solvent include water-soluble ether-based solvents, water-soluble ketone-based solvents, water-soluble alcohol-based solvents, and the like. Here, "water-soluble" means that 1% by mass or greater of the object substance dissolves with respect to water, at 25° C.

The above-described water-soluble organic solvent may be used alone, and in a case where two or more kinds are used in combination, for example, a combination of a water-soluble ether-based solvent and a water-soluble alcohol-based solvent, a combination of a water-soluble ketone-based solvent and a water-soluble alcohol-based solvent, and a combination of a water-soluble ether-based solvent, a water-soluble ketone-based solvent, and a water-soluble alcohol-based solvent can be exemplified.

The water-soluble ether-based solvent is a water-soluble solvent having an ether bond in one molecule. Examples of the water-soluble ether-based solvent include tetrahydrofuran (THF), dioxane, trioxane, 1,2-dimethoxyethane, diethylene glycol dimethyl ether, and diethylene glycol diethyl ether. Among these, as the water-soluble ether-based solvent, tetrahydrofuran and dioxane are preferable.

The water-soluble ketone-based solvent is a water-soluble solvent having a ketone group in one molecule. Examples of the water-soluble ketone-based solvent include acetone, methyl ethyl ketone, and cyclohexanone. Among these, as the water-soluble ketone-based solvent, acetone is preferable.

The water-soluble alcohol-based solvent is a water-soluble solvent having an alcoholic hydroxyl group in one molecule. Examples of the water-soluble alcohol-based solvent include methanol, ethanol, 1-propanol, 2-propanol, tert-butyl alcohol, ethylene glycol, 1,2-propanediol, 1,3-propanediol, 1,3-butanediol, 1,4-butanediol, 2,3-butanediol, 1,5-pentanediol, 2-butane-1,4-diol, 2-methyl-2,4-pentanediol, glycerin, 2-ethyl-2-hydroxymethyl-1,3-propanediol, and 1,2,6-hexanetriol. Among these, as the water-soluble alcohol-based solvent, methanol, ethanol, 2-propanol, and ethylene glycol are preferable.

In a case where a solvent other than water is contained as the water-based solvent, the solvent used in combination preferably has a boiling point of 160° C. or lower, more preferably has a boiling point of 40° C. or higher and 150° C. or lower, and further more preferably has a boiling point of 50° C. or higher and 120° C. or lower. When the boiling point of the solvent used in combination is in the above range, the solvent is less likely to remain in the polyimide molded body, and the polyimide molded body having high mechanical strength can be easily obtained.

Here, the range in which the specific polyimide precursor is dissolved in a solvent is controlled by the content of water, the kind and amount of the organic amine compound, and the kind and amount of the surfactant. In the range in which the content of water is low, the specific polyimide precursor is easily dissolved in the region in which a small amount of the organic amine compound and the surfactant is added. In contrast, in the range in which the content of water is high, the specific polyimide precursor is easily dissolved in the region in which a large amount of the organic amine compound and the cationic surfactant is added. In addition, when the organic amine compound includes a hydroxyl group, and thus, hydrophilicity is high, the specific polyimide precursor is easily dissolved in the range in which the content of water is high.

(Other Additives)

The polyimide precursor composition according to the present embodiment may include various types of fillers for the purpose of imparting various functions such as conductivity and mechanical strength to the polyimide molded body to be manufactured by using the same, and may also contain a catalyst for promoting the imidization reaction, or a leveling material for improving coating film quality.

As a conductive material to be added for imparting conductivity, a conductivity (for example, volume resistivity is less than $10^7$ Ω·cm, and the same shall apply hereinafter) or semi-conductive (for example, volume resistivity is $10^7$ Ω·cm or greater and $10^{13}$ Ω·cm or less, and the same shall apply hereinafter) can be exemplified, and is selected according to the intended purpose.

Examples of the conductive agent include carbon black (for example, acidic carbon black of pH 5.0 or less), metals (for example, aluminum, nickel, and the like), metal oxides (for example, yttrium oxide, tin oxide, and the like), ion conductive materials (for example, potassium titanate, LiCl, and the like), and conductive polymers (for example, polyaniline, polypyrrole, polysulfone, polyacetylene, and the like).

These conductive materials may be used alone or in combination of two or more kinds thereof.

In addition, in a case where the conductive material is particulate, the primary particle diameter is preferably less than 10 μm, and more preferably 1 μm or less.

As the filler to be added for improving mechanical strength, particulate materials such as silica powder, alumina powder, barium sulfate powder, titanium oxide powder, mica, and talc can be exemplified. In addition, to improve water repellency and releasing property of the polyimide molded body surface, fluorine resin powders such as polytetrafluoroethylene (PTFE), and tetrafluoroethylene perfluoroalkyl vinyl ether copolymer (PFA) may be added.

As the catalyst for promoting the imidization reaction, dehydrating agents such as an acid anhydride, phenol derivatives, or acid catalysts such as sulfonic acid derivatives and benzoic acid derivatives may also be used.

The content of other additives may be selected according to the intended purpose of the polyimide molded body to be manufactured.

<Method for Manufacturing Polyimide Precursor Composition>

The method for manufacturing the polyimide precursor composition according to the present embodiment is not particularly limited, and the manufacture method shown in the following (1) or (2) can be exemplified. Moreover, a surfactant is added in the course of the manufacture method shown in the following (1) or (2).

(1): A manufacture method having a step (hereinafter, referred to as "polymerization step") of producing a resin (hereinafter, referred to as "polyimide precursor") by polymerizing tetracarboxylic dianhydride and a diamine compound in a water-based solvent including water and a step (hereinafter, referred to as "amine salification step") of adding an organic amine compound to the water-based solvent in which the resin is produced after producing the resin.

Moreover, the manufacture method shown in (1) may have a step (hereinafter, referred to as "solvent substitution step") of substituting the solvent or changing the solvent constitution after the polymerization step, if necessary.

In the manufacture method shown in (1), after producing the polyimide precursor in a water-based solvent including water, an organic amine compound is added to the solvent, and the amine salification of the polyimide precursor (the carboxyl group thereof) is performed.

In the manufacture method shown in (1), after producing the polyimide precursor, by adding an organic amine compound (without adding an organic amine compound in the polymerization step), production inhibition (inhibition of the polymerization reaction) of the polyimide precursor by the organic amine compound is suppressed.

Here, in the manufacture method shown in (1), a surfactant is added to the composition in any step of the polymerization step, the amine salification step, and the solvent substitution step. In addition, the surfactant may be added to the composition after performing the entire steps.

Hereinafter, each step in the manufacture method shown in (1) will be described. Since each material to be used is the same as that described in the above-described polyimide precursor composition according to the present embodiment, the description will not be repeated.

(Polymerization Step)

In the polymerization step, a polyimide precursor is produced by polymerizing tetracarboxylic dianhydride and a diamine compound in a water-based solvent including water.

For example, the reaction temperature during the polymerization reaction of the polyimide precursor is preferably 0° C. or higher and 70° C. or lower, more preferably 10° C. or higher and 60° C. or lower, and further more preferably 20° C. or higher and 55° C. or lower. When the reaction temperature is 0° C. or higher, the progress of the polymerization reaction is promoted by removing the reaction heat generated by the polymerization reaction, the time required for the reaction is shortened, and the productivity is easily improved. On the other hand, when the reaction temperature is 70° C. or lower, the progress of the imidization reaction which occurs in the molecule of the produced polyimide precursor is suppressed, and precipitation or gelation due to solubility reduction of the polyimide precursor is easily suppressed.

Moreover, the polymerization reaction time of the polyimide precursor is preferably in the range of 1 hour or longer and 24 hours or shorter depending on the reaction temperature.

(Amine Salification Step)

In the amine salification step, after producing the polyimide precursor, an organic amine compound is added to a solvent, and the amine salification of the polyimide precursor (the carboxyl group thereof) is performed. Thus, solubility of the polyimide precursor with respect to a solvent is increased.

In the amine salification step, water may be added as a solvent.

(Solvent Substitution Step)

For example, the solvent substitution step is performed for the purpose of changing of the solvent constitution in the solution after production of the polyimide precursor, stabilization of the polyimide precursor composition to be manufactured, dissolution of the polyimide precursor to be produced, and adjustment of the solid content concentration.

The solvent substitution step is performed by adding water or other solvents or by removing the intended solvent. In the removal of the solvent, a method in which a solvent is distilled off by performing heating and reduction of pressure (distillation method), or a reprecipitation method in which after precipitating the polyimide precursor by adding water, the solvent is separated and removed is used. The removal of the solvent may be performed in combination of the distillation method and the reprecipitation method.

The solvent substitution step, the solvent constitution change step, and the amine salification step may be performed in any order. In addition, both steps may be performed at the same time.

Moreover, the solvent substitution step is a step which may not be performed if there is no need to change the solvent constitution in the solution after production of the polyimide precursor.

Here, in a case of performing the solvent substitution step, in the amine salification step, a first amine salification step or a second amine salification step as described below is preferably performed.

—First Amine Salification Step—

In the first amine salification step, after producing the polyimide precursor, water is added to the solvent, and the polyimide precursor and the solvent are separated, and after removing a part of the solvent after separation, water and an organic amine compound are added to the remainder.

Specifically, for example, in the first amine salification step, when an excessive amount of water is added to the solvent after producing the polyimide precursor, the solubility of the polyimide precursor is reduced, and precipitation occurs, and therefore, the polyimide precursor and the solvent are separated. For example, the added amount of water added to the solvent is preferably 10% by mass or greater and 300% by mass or less (more preferably 50% by mass or greater and 200% by mass or less) with respect to the entire solvent.

When the polyimide precursor and the solvent are separated, the polyimide precursor is deposited. The supernatant is a solvent, and by removing the supernatant liquid, a part of the solvent after separation is removed. The removal of a part of the solvent is not limited to the removal of the supernatant liquid, and may be performed by filtration or the like.

Then, when an organic amine compound (for example, an aqueous solution prepared by dissolving an organic amine compound) is added to the remainder with water which is a solvent, the solvent substitution is performed, and the amine salification of the polyimide precursor (the carboxyl group thereof) is performed.

When the first amine salification step is performed, a polyimide precursor composition with high purity is easily obtained.

—Second Amine Salification Step—

In the second amine salification step, after producing the polyimide precursor, an organic amine compound is added to the remainder after removing a part of the solvent or while removing a part of the solvent.

Specifically for example, in the second amine salification step, after producing the polyimide precursor, a part of the solvent is removed by heating or reducing the pressure. The removal of the solvent is mainly a removal of an organic solvent. Then, when an organic amine compound is added after removing the solvent or while removing a part of the solvent, the solvent constitution change is performed, and the amine salification of the polyimide precursor (the carboxyl group thereof) is performed. Moreover, when an organic amine compound is added, water may be added as a solvent.

When the second amine salification step is performed, a polyimide precursor composition which is solvent-substituted is easily obtained in a simple step without going through the precipitation of the polyimide precursor.

(2): A manufacture method having a step (hereinafter, referred to as "polymerization step") of producing a resin (hereinafter, referred to as "polyimide precursor") by polymerizing tetracarboxylic dianhydride and a diamine compound in the presence of an organic amine compound in a water-based solvent including water.

In addition, the manufacture method shown in (2) may have a step (hereinafter, referred to as "solvent substitution step") of substituting the solvent or changing the solvent constitution after the polymerization step, if necessary.

In the manufacture method shown in (2), production of the polyimide precursor is performed in the presence of an organic amine compound in a water-based solvent in which an aprotic polar solvent is not included, or at least the content of the aprotic polar solvent is reduced.

Here, in the manufacture method shown in (2), a surfactant is added to the composition in any step of the polymerization step and the solvent substitution step. In addition, the surfactant may be added to the composition after performing the entire steps.

Moreover, in the manufacture methods shown in (1) and (2), as a solvent, the aprotic polar solvent which cause reduction in the mechanical strength of a polyimide molded body is not used, or the used amount of the aprotic polar solvent is reduced. Therefore, in the manufacture methods shown in (1) and (2), a polyimide precursor composition by which a polyimide molded body having high mechanical strength can be obtained is manufactured. In addition, in the manufacture methods shown in (1) and (2), a polyimide precursor composition by which a polyimide molded body having excellent various characteristics such as the heat resistance, electrical characteristics, and solvent resistance in addition to the mechanical strength can be easily obtained is manufactured.

Furthermore, in the manufacture methods shown in (1) and (2), as a solvent, a water-based solvent including water is applied, and therefore, a polyimide precursor composition having high productivity is manufactured. In particular, when performing the solvent substitution, there is no need for excessive heating, and a thermal imidization of the produced polyimide precursor is easily suppressed.

<Polyimide Molded Body and Manufacture Method Thereof>

The method for manufacturing the polyimide molded body according to the present embodiment is a method for manufacturing a polyimide molded body by heat-treating the polyimide precursor composition (hereinafter, also referred to as "specific polyimide precursor composition") according to the present embodiment.

Specifically, for example, the method for manufacturing the polyimide molded body according to the present embodiment has a step (hereinafter, referred to as "coating film forming step") of forming a coating film by coating the specific polyimide precursor composition on an object to be coated, and a step (hereinafter, referred to as "heating step") of forming a polyimide resin layer by heat-treating the coating film.

(Coating Film Forming Step)

First, an object to be coated is prepared. The object to be coated is selected depending on the use of the polyimide molded body to be manufactured.

Specifically, in a case of manufacturing a liquid crystal alignment film as the polyimide molded body, as an object to be coated, various substrates applied to a liquid crystal element can be exemplified, and a silicon substrate, a glass substrate, and a substrate which a metal or alloy film is formed on the surfaces thereof can be exemplified.

In addition, in a case of manufacturing a passivation film as the polyimide molded body, for example, an object to be coated is selected from a semiconductor substrate on which an integrated circuit is formed, a wiring substrate on which wiring is formed, or a printed circuit substrate on which an electronic part and wiring are provided.

In addition, in a case of manufacturing a wire covering material as the polyimide molded body, as an object to be coated, various wires (a wire, a bar, or a plate made of metals such as soft copper, hard copper, oxygen-free copper, chromium ore, and aluminum, or alloys thereof) can be exemplified. Moreover, in a case where the polyimide molded body is molded and processed into a tape shape, and this is used as a wire covering material in a tape shape which is wound on a wire, various types of plane substrates or cylindrical substrates are used as the object to be coated.

In addition, in a case of manufacturing an adhesive film as the polyimide molded body, various types of molded bodies (for example, various electric parts such as a semiconductor chip, a printed circuit substrate, and the like) which are the adhesion targets can be exemplified.

Next, the specific polyimide precursor composition is coated on an intended object to be coated, whereby a coating film of the specific polyimide precursor composition is formed.

A method for coating the specific polyimide precursor composition is not particularly limited, and various types of coating methods such as a spray coating, a spin coating method, a roll coating method, a bar coating method, a slit die coating method, an inkjet coating method can be exemplified.

(Heating Step)

Next, a drying treatment is performed on the coating film of the specific polyimide precursor composition. By this drying treatment, a dried film (a dried film before imidization) is formed.

For example, heating conditions of the drying treatment is preferably 10 minutes or greater and 60 minutes or less at a temperature of 80° C. or higher and 200° C. or lower, and the heating time may be short when the temperature is high. During heating, blowing hot air is also effective. When heating, the temperature is increased stepwise, or may be increased without changing the speed.

Next, an imidization treatment is performed on the dried film. By this treatment, a polyimide resin layer is formed.

For example, by heating at 150° C. or higher and 400° C. or lower (preferably 200° C. or higher and 300° C. or lower) for 20 minutes or longer and 60 minutes or shorter as the heating conditions of the imidization treatment, an imidization reaction occurs, whereby a polyimide resin layer is formed. During the reaction by heating, before reaching the final heating temperature, heating is preferably performed by gradually increasing the temperature stepwise, or at a constant rate.

Through the above steps, the polyimide molded body is formed. Then, the polyimide molded body is removed from the object to be coated, and a post-processing is performed, if necessary.

<Polyimide Molded Body>

The polyimide molded body according to the present embodiment is a polyimide molded body obtained by the above-described method for manufacturing the polyimide molded body according to the present embodiment. As the polyimide molded body, various types of polyimide molded bodies such as a liquid crystal alignment film, a passivation film, a wire covering material, and an adhesive film can be exemplified. As other polyimide molded bodies, a flexible electronic substrate film, a copper-clad laminate film, a laminate film, an electric insulation film, a porous film for a fuel cell, a separation film, a heat resistant film, an IC package, a resist film, a planarization film, a microlens array film, and a optical fiber coating film can be also exemplified.

As the polyimide molded body, a belt member can be also exemplified. As the belt member, a drive belt, and a belt for an image forming apparatus of an electrophotographic system (for example, an intermediate transfer belt, a transfer belt, a fixing belt, and a conveying belt) can be exemplified.

That is, the method for manufacturing the polyimide molded body according to the present embodiment can be applied to a method for manufacturing various types of the polyimide molded bodies exemplified above.

In the polyimide molded body according to the present embodiment, a water-based solvent included in the specific polyimide precursor composition, an organic amine compound, and a surfactant are contained.

The water-based solvent contained in the polyimide molded body according to the present embodiment is 1 ppb or greater and less than 1% in the polyimide molded body. The amount of the water-based solvent contained in the polyimide molded body is determined by quantifying the gas generated by heating the polyimide molded body using a gas chromatography. In addition, the amount of the organic amine compound and the surfactant included in the polyimide molded body is also determined by quantifying the gas generated by heating the polyimide molded body using a gas chromatography.

EXAMPLES

Hereinafter, examples of the invention will be described, but the invention is not limited to the examples. Moreover, in the following description, "part" and "% o" are all by mass, unless specified otherwise.

Example 1

Preparation of Polyimide Precursor Compositions (A-1) and (A-2)

—Polymerization Step—

360 g of tetrahydrofuran (hereinafter, referred to as THF) and 40 g of water are filled in a flask provided with a stirring rod, a thermometer, and a dropping funnel. 41.23 g (205.92 mmol) of 4,4'-diaminodiphenyl ether (hereinafter, referred to as ODA: molecular weight is 200.24) is added thereto while a dried nitrogen gas is flowed in. While maintaining the solution temperature at 30° C., stirring is performed, and 58.77 g (199.75 mmol) of 3,3',4,4'-biphenyltetracarboxylic dianhydride (hereinafter, referred to as BPDA: molecular weight is 294.22) is gradually added. After confirming dissolution of the diamine compound and the tetracarboxylic dianhydride, a reaction is performed for 24 hours while maintaining the reaction temperature at 30° C. When a viscosity of the polyimide precursor solution (solid content is 20% by mass) is measured by the method described below, the viscosity is 70 Pa·s.

Moreover, an imidation ratio of the produced polyimide precursor is 0.02, and as a result of measuring the amount of the terminal amino group described above, the produced polyimide precursor has an amino group at least one terminal.

—Amine Salification Step—

While stirring the polyimide precursor solution obtained in the polymerization step, 35.62 g (399.5 mmol) of dimethylaminoethanol (hereinafter, referred to as DMAEt: molecular weight is 89.14: organic amine compound) and 400 g of water are added. Thus, a polyimide precursor aqueous solution which is water-solubilized by amine salification of the polyimide precursor is obtained.

Lauryl trimethyl ammonium chloride (trade name is QUARTAMIN 24P (manufactured by Kao Corporation): cationic surfactant) is added to the obtained polyimide precursor aqueous solution such that the amount of lauryl trimethyl ammonium chloride becomes 0.01% by mass with respect to a polyimide precursor composition to be obtained, and this solution is used as a polyimide precursor resin composition (A-1). The constitution of the obtained polyimide precursor resin composition (A-1) is as follows.

~Constitution of Polyimide Precursor Resin Composition (A-1)~

Solid content: 10% (solid content fraction as polyimide)
Solvent composition ratio: THF/water=360 g/440 g —Solvent Substitution Step—

While stirring the polyimide precursor resin composition (A-1), the pressure is reduced at 10 mmHg/30° C., and a part of THF is distilled off, whereby a polyimide precursor resin composition (A-2) having the following constitution is obtained.

~Constitution of Polyimide Precursor Resin Composition (A-2)~

Viscosity: 50 Pa·s
Solid content: 13.0% (solid content fraction as polyimide)
Solvent composition ratio: THF/water=6/94

Moreover, each measurement is as follows.

(Viscosity Measurement Method)

Viscosity is measured under the following conditions using an E-type rotational viscometer.

Measurement apparatus: E-type rotational viscometer TV-20H (manufactured by Toki Sangyo Co., Ltd.)
Measurement probe: No. 3 type rotor 3°×R14
Measurement temperature: 22° C.

(Solid Content Measurement Method)

The solid content is measured under the following conditions using a differential thermal gravimetric simultaneous measurement apparatus. Moreover, the solid content is measured as a solid content fraction as polyimide with a measured value at 380° C.

Measurement apparatus: Differential thermal gravimetric simultaneous measurement apparatus TG/DTA6200 (manufactured by Seiko Instruments Inc)
Measurement range: 20° C. or higher and 400° C. or lower
Temperature raising rate: 20° C./min (Solvent Constitution and Water Content in Solvent)

A water content in the polyimide precursor composition is measured under the following conditions using a coulometric titration method automatic water content measurement apparatus (Karl Fischer). By excluding values derived from the resin content included in the sample from the measured values, the water content in the solvent is calculated. Thus, a solvent constitution is obtained.

Measurement apparatus: coulometric titration method automatic water content measurement apparatus (Karl Fischer) CA-07 type (Mitsubishi Chemical Corporation)

Amount of sample: 10 μl

<Evaluation>

Storage stability of the obtained polyimide precursor compositions (A-1) and (A-2) is evaluated. In addition, a film is prepared using the polyimide precursor compositions (A-1) and (A-2), and the coating stability and the film-forming properties thereof are evaluated.

(Storage Stability)

Liquid properties and the viscosity immediately after preparation of the polyimide precursor compositions (A-1) and (A-2), and after storing at room temperature (25° C.) for 20 days are examined.

(Coating Stability)

A film is formed by the following operation using the polyimide precursor compositions (A-1) and (A-2). (1) Surface unevenness and marks, and (2) repelling of a coating film immediately after coating are evaluated.

Coating method: a bar coating method by which a film is formed such that the coating thickness becomes 100 μm using a coating blade provided with a spacer.

Coating substrate: 1.1 mmt glass plate

Drying temperature: 60° C.×10 min

Firing temperature: 250° C.×30 min (1) Surface Unevenness and Marks

The presence or absence of the surface unevenness and marks that occur on the surface of the coating film is evaluated. The evaluation criteria are as follows.

A: Occurrence of the surface unevenness and marks is not observed.

B: The surface unevenness and marks can be slightly confirmed on a part of the surface of the coating film (less than 10% of the coating film surface area).

C: The surface unevenness and marks can be confirmed on a part of the surface of the coating film.

D: The surface unevenness and marks uniformly occur on the surface of the coating film (10% or greater of the coating film surface area).

(2) Repelling

The presence of absence of repelling that occurs on the surface of the coating film is evaluated. The evaluation criteria are as follows.

A: Occurrence of the repelling is not observed.

B: The repelling can be slightly confirmed on a part of the surface of the coating film (less than 5% of the coating film surface area).

C: The repelling can be confirmed on a part of the surface of the coating film.

D: The repelling uniformly occurs on the surface of the coating film (15% or greater of the coating film surface area).

(Film-Forming Properties)

A film is formed by the following operation using the polyimide precursor compositions (A-1) and (A-2). (3) A void trace and (4) the surface unevenness and marks of the formed coating film are evaluated.

(3) Void Trace

The presence of absence of the void trace on the formed coating surface is evaluated. The evaluation criteria are as follows.

A: Occurrence of the void trace is not observed.

B: The void traces of one or more and less than 10 can be confirmed on the formed film surface.

C: The void traces of 10 or more and less than 50 can be scattered present on the formed film surface.

D: A large number of the void traces uniformly occur on the formed film surface.

(4) Surface Unevenness and Marks:

The presence or absence of the surface unevenness and marks that occur on the surface of the formed coating film is evaluated. The evaluation criteria are as follows.

A: Occurrence of the surface unevenness and marks is not observed.

B: The surface unevenness and marks can be slightly confirmed on a part of the formed film surface (less than 10% of the formed film surface area).

C: The surface unevenness and marks can be confirmed on a part of the formed film surface.

D: The surface unevenness and marks uniformly occur on the formed film surface (10% or greater of the formed film surface area).

Examples 2 to 6

Preparation of Polyimide Precursor Compositions (A-3) to (A-7)

Polyimide precursor compositions (A-3) to (A-7) are prepared in the same manner as in Example 1 except that the conditions of the polymerization step, and the amine salification step of the polyimide precursor composition, and the solvent substitution step are changed to the conditions described in the following Table 1.

Then, after the storage stability is evaluated in the same manner as in Example 1, a film is formed, and the coating stability and the film-forming properties thereof are evaluated. The evaluation results are shown in Table 1.

Comparative Example 1

Preparation of Polyimide Precursor Compositions (X-1) and (X-2)

400 g of N-methyl-2-pyrrolidone (hereinafter, referred to as NMP) is filled in a flask provided with a stirring rod, a thermometer, and a dropping funnel. 41.23 g (205.92 mmol) of ODA is added thereto while a dried nitrogen gas is flowed in. While maintaining the solution temperature at 30° C., stirring is performed, and 58.77 g (199.75 mmol) of BPDA is gradually added. After confirming dissolution of the diamine compound and the tetracarboxylic dianhydride, a reaction is performed for 24 hours while maintaining the reaction temperature at 30° C. When a viscosity of the polyimide precursor solution (solid content is 20% by mass) is measured by the method described above, the viscosity is 160 Pa·s.

Lauryl trimethyl ammonium chloride (trade name is QUARTAMIN 24P (manufactured by Kao Corporation): cationic surfactant) is added to the obtained polyimide precursor aqueous solution such that the amount of lauryl trimethyl ammonium chloride becomes 0.01% by mass with respect to a polyimide precursor composition to be obtained, and this solution is used as a polyimide precursor composition (X-1).

Then, after the storage stability is evaluated in the same manner as in Example 1, a film is formed, and the coating stability and the film-forming properties thereof are evaluated. The evaluation results are shown in Table 2.

Moreover, each of the obtained polyimide precursor composition (X-1) and the (A-1) obtained in Example 1 is stored for 24 hours in an environment of 50° C. The (X-1) after storing is used as (X-2). When comparing the liquid states of the (X-2) and (A-1), in the (A-1), a resin is dissolved in a nearly uniform state and stable, however, in the (X-2), a resin is precipitated. It is considered that since imidization is proceeded when the storage temperature is set to 50° C., the resin is precipitated.

Comparative Example 2

Preparation of Polyimide Precursor Composition (X-3)

A polyimide precursor composition (X-3) is prepared in the same manner as in the polyimide precursor composition (A-2) in Example 1 except that lauryl trimethyl ammonium chloride (cationic surfactant) is not added. When confirming the solution properties of the (X-3) after storing at room temperature (25° C.) for 20 days, gelation is proceeded. It is considered that this is because viscosity is gradually thickened since a cationic surfactant is not added.

Comparative Example 3

Preparation of Polyimide Precursor Composition (X-4)

A polyimide precursor composition (X-4) is prepared in the same manner as in the polyimide precursor composition (A-3) except that lauryl trimethyl ammonium chloride (cationic surfactant) is not added. When confirming the solution properties of the (X-4) after storing at room temperature (25° C.) for 5 days, gelation is proceeded. It is considered that this is because viscosity is rapidly thickened since a cationic surfactant is not added.

Example 7

Preparation of Polyimide Precursor Composition (B-1)

—Polymerization Step—

900 g of water is filled in a flask provided with a stirring rod, a thermometer, and a dropping funnel. Here, 27.28 g (252.27 mmol) of p-phenylenediamine (hereinafter, referred to as PDA: molecular weight is 108.14) and 50.00 g (494.32 mmol) of methylmorpholine (hereinafter, referred to as MMO: organic amine compound) are added, and the resultant mixture is stirred at 20° C. for 10 minutes to disperse. Lauryl trimethyl ammonium chloride (trade name is QUARTAMIN 24P (manufactured by Kao Corporation): cationic surfactant) is added to the solution such that the amount of lauryl trimethyl ammonium chloride becomes 0.01% by mass with respect to a polyimide precursor composition to be obtained. In addition, 72.72 g (247.16 mmol) of 3,3',4,4'-biphenyltetracarboxylic dianhydride (hereinafter referred to as BPDA: molecular weight is 294.22) is added to the solution, the resultant mixture is stirred to dissolve for 24 hours while maintaining the reaction temperature at 20° C., and the reaction is performed, whereby a polyimide precursor aqueous solution (B-1) is obtained.

Then, after the storage stability is evaluated in the same manner as in Example 1, a film is formed, and the coating stability and the film-forming property thereof are evaluated. The evaluation results are shown in Table 3.

Moreover, an imidation ratio of the produced polyimide precursor is 0.02, and as a result of measuring the amount of the terminal amino group described above, the produced polyimide precursor have an amino group at least a terminal.

Examples 8 to 22

Preparation of Polyimide Precursor Compositions (B-2) to (B-16)

Polyimide precursor compositions (B-2) to (B-16) are prepared in the same manner as in Example 7 except that the conditions of the polymerization step of the polyimide precursor composition are changed to the conditions described in Tables 3 to 5.

Then, after the storage stability was evaluated in the same manner as in Example 1, a film was formed, and the coating stability and the film-forming property thereof were evaluated. The evaluation results are described in Tables 3 to 5.

Moreover, as a result of the measurement of the terminal amino group amount described above, the polyimide precursor produced in Example 22 does not include the amino group terminal, however, the entire terminals of the polyimide precursor have carboxyl groups.

Comparative Example 4

Preparation of Polyimide Precursor Composition (Y-1)

—Polymerization Step—

900 g of NMP is filled in a flask provided with a stirring rod, a thermometer, and a dropping funnel. Here, 27.28 g (252.27 mmol) of PDA is added thereto, and the resultant mixture is stirred to disperse at 20° C. for 10 minutes. 72.72 g (247.16 mmol) of BPDA is added to the solution, the resultant mixture is stirred to dissolve for 24 hours while maintaining the reaction temperature at 20° C., and the reaction is performed, whereby a polyimide precursor aqueous solution is obtained.

Lauryl trimethyl ammonium chloride (trade name is QUARTAMIN 24P (manufactured by Kao Corporation)) is added to the obtained polyimide precursor aqueous solution such that the amount of lauryl trimethyl ammonium chloride becomes 0.01% by mass with respect to a polyimide precursor composition to be obtained, and this solution is used as a polyimide precursor composition (Y-1).

Then, after the storage stability is evaluated in the same manner as in Example 1, a film is formed, and the coating stability and the film-forming property thereof are evaluated. The evaluation results are shown in Table 2.

Moreover, each of the obtained polyimide precursor composition (Y-1) and the (B-1) obtained in Example 7 is stored for 24 hours in an environment of 50° C. The (Y-1) after storing was used as (Y-2). When comparing the liquid states of the (Y-2) and (B-1), in the (B-1), a resin is dissolved in a nearly uniform state and stable, however, in the (Y-2), a resin is precipitated. It is considered that since imidization is proceeded when the storage temperature is set to 50° C., the resin is precipitated.

Comparative Example 5

Preparation of Polyimide Precursor Composition (Y-3)

—Polymerization Step—

900 g of water is filled in a flask provided with a stirring rod, a thermometer, and a dropping funnel. Here, 27.28 g (252.27 mmol) of PDA and 51.03 g (504.54 mmol) of MMO are added thereto, and the resultant mixture is stirred to disperse at 20° C. for 10 minutes. 72.72 g (247.16 mmol) of BPDA is added to the solution, the resultant mixture is stirred to dissolve for 24 hours while maintaining the reaction temperature at 20° C., and the reaction is performed, whereby a polyimide precursor composition (Y-3) is obtained.

When confirming the solution properties of the (Y-3) after storing at room temperature (25° C.) for 20 days, gelation is proceeded. It is considered that this is because viscosity is gradually thickened since a cationic surfactant is not added.

Comparative Example 6

Preparation of Polyimide Precursor Composition (Y-7)

A polyimide precursor composition (Y-7) is prepared in the same manner as in Example 7 except that the conditions of the polymerization step of the polyimide precursor composition are changed to the conditions described in Table 6.

When confirming the solution properties of the (Y-7) after storing at room temperature (25° C.) for 5 days, gelation is proceeded. It is considered that this is because viscosity is rapidly thickened since a cationic surfactant is not added.

<Odor Test>

The tests are performed on odor of the polyimide precursor composition obtained in each example by a total of 10 people of testers A to J. The testers A to J were five men and five women who were chosen at random, and a method in which the sample identity is hidden, and a sample which is most foul-smelling is selected by the sample number was performed.

The odor test is performed two times. That is, an odor test (1) is performed using samples of the polyimide precursor compositions (A-1) to (A-7), and (X-3), and an odor test (2) is performed using samples of the polyimide precursor compositions (B-1) to (B-16), and (Y-3). The results of each odor test are shown in Table 7.

TABLE 1

| | | | Example-Comparative Example | | | | | | |
|---|---|---|---|---|---|---|---|---|---|
| | | | Example 1 | Example 2 | Example 3 | Example 4 | Example 5 | Example 6 | Example 6 |
| Polyimide precursor composition | | | A-1 | A-2 | A-3 | A-4 | A-5 | A-6 | A-7 |
| Polymerization step | Tetracarboxylic dianhydride | Chemical species | BPDA | BPDA | BPDA | BPDA | BPDA | BPDA | BPDA |
| | | g | 58.77 | 58.77 | 58.77 | 58.77 | 58.77 | 72.52 | 58.77 |
| | | mmol | 199.75 | 199.75 | 199.75 | 199.75 | 199.75 | 246.48 | 199.75 |
| | Diamine compound | Chemical species | ODA | ODA | ODA | ODA | ODA | PDA | ODA |
| | | g | 41.23 | 41.23 | 41.23 | 41.23 | 41.23 | 27.48 | 41.23 |
| | | mmol | 205.92 | 205.92 | 205.92 | 205.92 | 205.92 | 254.12 | 205.92 |
| | Tetracarboxylic dianhydride/diamine compound (molar ratio) | | 0.98 | 0.98 | 0.98 | 0.98 | 0.98 | 0.98 | 0.98 |
| | Solvent 1 | Chemical species | THF | THF | THF | THF | THF | THF | THF |
| | | g | 360 | 360 | 360 | 360 | 360 | 360 | 320 |
| | Solvent 2 | Chemical species | Water | Water | Water | Water | Water | Water | Water |
| | | g | 40 | 40 | 40 | 40 | 40 | 40 | 80 |
| | Solvent 1/solvent 2 | | 9/1 | 9/1 | 9/1 | 9/1 | 9/1 | 9/1 | 8/2 |
| | Liquid state | | Dissolution | Dissolution | Dissolution | Dissolution | Dissolution | Dissolution | Dissolution |
| | Imidation ratio | % | 0.02 | 0.02 | 0.02 | 0.02 | 0.02 | 0.08 | 0.03 |
| | Molecular weight | Mn | 20000 | 20000 | 20000 | 20000 | 20000 | 20000 | 15000 |
| | Polyimide precursor solid content | % | 20 | 20 | 20 | 20 | 20 | 20 | 20 |
| | Viscosity | Pa · s | 70 | 70 | 70 | 70 | 70 | 70 | 100 |
| Amine salification step | Organic amine compound | Chemical species | DMAEt | DMAEt | DMAEt | DMAEt | γ-Pyc | DMAEt | DMAEt |
| | | g | 35.62 | 35.62 | 10.68 | 178.1 | 58.08 | 35.62 | 35.62 |
| | | mmol | 399.5 | 399.5 | 119.85 | 1997.5 | 399.5 | 399.5 | 399.5 |
| | Added solvent | Chemical species | Water | Water | Water | Water | Water | Water | Water |
| | | g | 400 | 400 | 400 | 400 | 400 | 400 | 400 |
| | Processing ratio | mol % | 100 | 100 | 30 | 500 | 100 | 100 | 100 |
| | Liquid state | | Dissolution | Dissolution | Dissolution | Dissolution | Dissolution | Dissolution | Dissolution |
| Solvent substitution step | Liquid state | | — | Dissolution | Dissolution | Dissolution | Dissolution | Dissolution | Dissolution |
| | Polyimide solid content | % | — | 13 | 13 | 13 | 13 | 18 | 18 |
| | Viscosity | Pa · s | — | 50 | 120 | 35 | 90 | 85 | 98 |
| | Water content in solvent | % | — | 94 | 98 | 86 | 92 | 92 | 96 |
| Surfactant | Trade name | | QUARTAMIN 24P | QUARTAMIN 24P | QUARTAMIN 24P | QUARTAMIN 24P | QUARTAMIN 24P | QUARTAMIN 24P | QUARTAMIN 24P |

TABLE 1-continued

| | | Example 1 | Example 2 | Example 3 | Example 4 | Example 5 | Example 6 | Example 7 |
|---|---|---|---|---|---|---|---|---|
| | Effective component | LTMAC | LTMAC | LTMAC | LTMAC | LTMAC | LTMAC | LTMAC |
| | Added amount % | 0.01 | 0.01 | 0.01 | 0.01 | 0.01 | 0.01 | 0.01 |
| Storage stability | Storage condition | At room temperature for 20 days | At room temperature for 20 days | At room temperature for 20 days | At room temperature for 20 days | At room temperature for 20 days | At room temperature for 20 days | At room temperature for 20 days |
| | Liquid state | Dissolution | Dissolution | Dissolution | Dissolution | Dissolution | Dissolution | Dissolution |
| | Viscosity Pa·s | 60 | 53 | 130 | 40 | 92 | 90 | 104 |
| Coating stability | Surface unevenness and marks | A | A | B | B | A | A | A |
| | Repelling | A | A | B | A | A | A | A |
| Film-forming property | Void trace | A | A | B | B | B | A | A |
| | Surface unevenness and marks | A | A | B | B | B | A | A |

TABLE 2

| | | | Comparative Example 1 | Comparative Example 2 | Comparative Example 3 |
|---|---|---|---|---|---|
| Polyimide precursor composition | | | X-1      X-2 | X-3 | X4 |
| Polymerization step | Tetracarboxylic dianhydride | Chemical species | BPDA | BPDA | BPDA |
| | | g | 58.77 | 58.77 | 58.77 |
| | | mmol | 199.75 | 199.75 | 199.75 |
| | Diamine compound | Chemical species | ODA | ODA | ODA |
| | | g | 41.23 | 41.23 | 41.23 |
| | | mmol | 205.92 | 205.92 | 205.92 |
| | Tetracarboxylic dianhydride/diamine compound (molar ratio) | | 0.98 | 0.98 | 0.98 |
| | Solvent 1 | Chemical species | NMP | THF | THF |
| | | g | 400 | 360 | 360 |
| | Solvent 2 | Chemical species | — | Water | Water |
| | | g | — | 40 | 40 |
| | Solvent 1/solvent 2 | | 10/0 | 9/1 | 9/1 |
| | Liquid state | | Dissolution | Dissolution | Dissolution |
| | Imidation ratio | % | 0.02 | 0.02 | 0.02 |
| | Molecular weight | Mn | 12000 | 20000 | 20000 |
| | Polyimide precursor solid content | % | 20 | 20 | 20 |
| | Viscosity | Pa·s | 160 | 70 | 70 |
| Amine salification step | Organic amine compound | Chemical species | — | DMAEt | DMAEt |
| | | g | — | 35.62 | 10.68 |
| | | mmol | — | 399.5 | 119.85 |
| | Added solvent | Chemical species | — | Water | Water |
| | | g | — | 400 | 400 |
| | Processing ratio | mol % | — | 100 | 30 |
| | Liquid state | | — | Dissolution | Dissolution |
| Solvent substitution step | Liquid state | | — | Dissolution | Dissolution |
| | Polyimide solid content | % | — | 13 | 13 |
| | Viscosity | Pa·s | — | 50 | 150 |
| | Water content in solvent | % | — | 94 | 98 |
| Surfactant | Trade name | | QUARTAMIN 24P | — | — |
| | Effective component | | LTMAC | — | — |
| | Added amount | % | 0.01 | — | — |
| Storage stability | Storage condition | | Immediately after preperation | At 50° C. for 24 hours | At room temperature for 20 days | At room temperature for 5 days |
| | Liquid state | | Dissolution | Precipitation | Gelation | Gelation |
| | Viscosity | Pa·s | 160 | — | — | — |

TABLE 2-continued

|  |  | Example-Comparative Example | | |
|---|---|---|---|---|
|  |  | Comparative Example 1 | Comparative Example 2 | Comparative Example 3 |
| Coating stability | Surface unevenness and marks | C | — | — |
|  | Repelling | C | — | — |
| Film-forming property | Void trace | C | — | — |
|  | Surface unevenness and marks | C | — | — |

TABLE 3

| | | | Example-Comparative Example | | | | | |
|---|---|---|---|---|---|---|---|---|
| | | | Example 7 | Example 8 | Example 9 | Example 10 | Example 11 | Example 12 |
| Polyimide precursor composition | | | B-1 | B-2 | B-3 | B-4 | B-5 | B-6 |
| Polymerization step | Tetracarboxylic dianhydride | Chemical species | BPDA | BPDA | BPDA | PMDA | BPDA | BPDA |
| | | g | 72.72 | 72.72 | 72.72 | 72.72 | 72.72 | 72.72 |
| | | mmol | 247.16 | 247.16 | 247.16 | 247.16 | 247.16 | 247.16 |
| | Diamine compound | Chemical species | PDA | PDA | PDA | PDA | PDA | PDA |
| | | g | 27.28 | 27.28 | 27.28 | 27.28 | 27.28 | 27.28 |
| | | mmol | 252.27 | 252.27 | 252.27 | 252.27 | 252.27 | 252.27 |
| | Tetracarboxylic dianhydride/diamine compound (molar ratio) | | 0.98 | 0.98 | 0.98 | 0.98 | 0.98 | 0.98 |
| | Organic amine compound | Chemical species | MMO | MMO | MMO | MMO | MMO | MMO |
| | | g | 50.00 | 50.00 | 50.00 | 50.00 | 50.00 | 50.00 |
| | | mmol | 494.32 | 494.32 | 494.32 | 494.32 | 494.32 | 494.32 |
| | Processing ratio | mol % | 100 | 100 | 100 | 100 | 100 | 100 |
| | Solvent | Chemical species | Water | Water | Water | Water | Water | Water |
| | | g | 900 | 900 | 900 | 900 | 900 | 900 |
| | Polyimide precursor solid content | % | 13 | 13 | 13 | 13 | 13 | 13 |
| | Liquid state | | Dissolution | Dissolution | Dissolution | Dissolution | Dissolution | Dissolution |
| | Imidation ratio | % | 0.02 | 0.02 | 0.02 | 0.02 | 0.02 | 0.02 |
| | Molecular weight | Mn | 20000 | 20000 | 20000 | 20000 | 20000 | 20000 |
| | Polyimide precursor solid content | % | 9.1 | 9.1 | 9.1 | 9.1 | 9.1 | 9.1 |
| | Viscosity | Pa · s | 60 | 60 | 60 | 60 | 55 | 62 |
| | Terminal amino group | | Containing | Containing | Containing | Containing | Containing | Containing |
| | Surfactant | Trade name | QUARTMIN 24P | QUARTMIN 86W | QUARTMIN D86P | SANISOL C | QUARTMIN 24P | QUARTMIN 24P |
| | | Effective component | LTMAC | STMAC | DSDMAC | ABDMAC | LTMAC | LTMAC |
| | | % | 0.01 | 0.01 | 0.01 | 0.01 | 0.1 | 0.001 |
| Storage stability | Storage condition | | At room temperature for 20 days | At room temperature for 20 days | At room temperature for 20 days | At room temperature for 20 days | At room temperature for 20 days | At room temperature for 20 days |
| | Liquid state | | Dissolution | Dissolution | Dissolution | Dissolution | Dissolution | Dissolution |
| | Viscosity | Pa · s | 62 | 65 | 63 | 70 | 58 | 67 |
| Coating stability | Surface unevenness and marks | | A | B | A | A | A | A |
| | Repelling | | A | B | A | A | A | A |
| Film-forming property | Void trace | | A | B | A | B | A | A |
| | Surface unevenness and marks | | A | B | A | B | A | A |

TABLE 4

| | | | Example-Comparative Example | | | |
|---|---|---|---|---|---|---|
| | | | Example 13 | Example 14 | Example 15 | Example 16 |
| Polyimide precursor composition | | | B-7 | B-8 | B-9 | B-10 |
| Polymerization step | Tetracarboxylic dianhydride | Chemical species | BPDA | PMDA | BTDA | BPDA |
| | | g | 58.9 | 51.52 | 74.32 | 72.72 |
| | | mmol | 200.24 | 236.21 | 223.7 | 247.16 |
| | Diamine compound | Chemical species | ODA | ODA | PDA | PDA |
| | | g | 40.9 | 48.24 | 25.45 | 27.28 |
| | | mmol | 204.27 | 240.92 | 235.35 | 252.27 |

TABLE 4-continued

|  |  |  | Example-Comparative Example | | | |
|---|---|---|---|---|---|---|
|  |  |  | Example 13 | Example 14 | Example 15 | Example 16 |
|  | Tetracarboxylic dianhydride/diamine compound (molar ratio) |  | 0.98 | 0.98 | 0.98 | 0.98 |
|  | Organic amine compound | Chemical species | MMO | MMO | MMO | MMO |
|  |  | g | 40.51 | 47.79 | 47.61 | 15.00 |
|  |  | mmol | 400.48 | 472.42 | 447.4 | 148.30 |
|  | Processing ratio | mol % | 100 | 100 | 100 | 30 |
|  | Solvent | Chemical species | Water | Water | Water | Water |
|  |  | g | 900 | 900 | 900 | 900 |
|  | Polyimide precursor solid content | % | 13 | 13 | 13 | 13 |
|  | Liquid state |  | Dissolution | Dissolution | Dissolution | Dissolution |
|  | Imidation ratio | % | 0.02 | 0.02 | 0.02 | 0.02 |
|  | Molecular weight | Mn | 20000 | 20000 | 20000 | 20000 |
|  | Polyimide precursor solid content | % | 9.1 | 9.1 | 9.2 | 9.1 |
|  | Viscosity | Pa · s | 40 | 40 | 30 | 100 |
|  | Terminal amino group |  | Containing | Containing | Containing | Containing |
|  | Surfactant | Trade name | QUARTMIN 24P | QUARTMIN 24P | QUARTMIN 24P | QUARTMIN 24P |
|  |  | Effective component |  |  |  |  |
|  |  | % | LTMAC 0.01 | LTMAC 0.01 | LTMAC 0.01 | LTMAC 0.01 |
| Storage stability | Storage condition |  | At room temperature for 20 days | At room temperature for 20 days | At room temperature for 20 days | At room temperature for 20 days |
|  | Liquid state |  | Dissolution | Dissolution | Dissolution | Dissolution |
|  | Viscosity | Pa · s | 65 | 68 | 73 | 70 |
| Coating stability | Surface unevenness and marks |  | A | A | B | B |
|  | Repelling |  | A | A | B | B |
| Film-forming properties | Void trace |  | A | A | B | B |
|  | Surface unevenness and marks |  | A | A | B | B |

TABLE 5

|  |  |  | Example-Comparative Example | | | | | |
|---|---|---|---|---|---|---|---|---|
|  |  |  | Example 17 | Example 18 | Example 19 | Example 20 | Example 21 | Example 22 |
| Polyimide precursor composition |  |  | B-11 | B-12 | B-13 | B-14 | B-15 | B-16 |
| Polymerization step | Tetracarboxylic dianhydride | Chemical species | BPDA | BDPA | BPDA | PMDA | BPDA | CBDA |
|  |  | g | 72.72 | 72.72 | 72.72 | 51.52 | 72.72 | 67.46 |
|  |  | mmol | 247.16 | 247.16 | 247.16 | 236.21 | 247.16 | 290.60 |
|  | Diamine compound | Chemical species | PDA | PDA | PDA | ODA | PDA | 1,6-Cyclo-hexane-diamine |
|  |  | g | 27.28 | 27.28 | 27.28 | 48.24 | 27.28 | 32.54 |
|  |  | mmol | 252.27 | 252.27 | 252.27 | 240.92 | 252.27 | 284.96 |
|  | Tetracarboxylic dianhydride/diamine compound (molar ratio) |  | 0.98 | 0.98 | 0.98 | 0.98 | 0.98 | 1.02 |
|  | Organic amine compound | Chemical species | MMO | 1-Methyl piperidine | N,N-dimethyl piperazine | 1-Methyl pyrrolidine | morpholine | MMO |
|  |  | g | 250.00 | 50.00 | 50.00 | 47.79 | 43.07 | 58.79 |
|  |  | mmol | 2471.6 | 494.32 | 494.32 | 472.42 | 494.32 | 581.20 |
|  | Processing ratio | mol % | 500 | 100 | 100 | 100 | 100 | 100 |
|  | Solvent | Chemical species | Water | Water | Water | Water | Water | Water |
|  |  | g | 900 | 900 | 900 | 900 | 900 | 900 |
|  | Polyimide precursor solid content | % | 13 | 13 | 13 | 13 | 13 | 13 |
|  | Liquid state |  | Dissolution | Dissolution | Dissolution | Dissolution | Dissolution | Dissolution |
|  | Imidation ratio | % | 0.02 | 0.05 | 0.05 | 0.06 | 0.02 | 0.02 |
|  | Molecular weight | Mn | 20000 | 100000 | 20000 | 20000 | 20000 | 20000 |
|  | Polyimide precursor solid content | % | 9.1 | 9.1 | 9.1 | 9.3 | 9.1 | 9.1 |

TABLE 5-continued

|  |  |  | Example 17 | Example 18 | Example 19 | Example 20 | Example 21 | Example 22 |
|---|---|---|---|---|---|---|---|---|
|  | Viscosity | Pa·s | 10 | 40 | 40 | 20 | 60 | 30 |
|  | Terminal amino group |  | Containg | Containg | Containg | Containg | Containg | Not Containg |
|  | Surfactant | Trade name | QUARTAMIN 24P | QUARTAMIN 24P | QUARTAMIN 24P | QUARTAMIN 24P | QUARTAMIN 24P | QUARTAMIN 24P |
|  |  | Effective component |  |  |  |  |  |  |
|  |  | % | LTMAC 0.01 | LTMAC 0.01 | LTMAC 0.01 | LTMAC 0.01 | LTMAC 0.01 | LTMAC 0.01 |
| Storage stability | Storage condition |  | At room temperate for 20 days | At room temperature for 20 days | At room temperature for 20 days | At room temperature for 20 days | At room temperature for 20 days | At room temperature for 20 days |
|  | Liquid state |  | Dissolution | Dissolution | Dissolution | Dissolution | Dissolution | Dissolution |
|  | Viscosity | Pa·s | 50 | 60 | 72 | 40 | 125 | 45 |
| Coating stability | Surface unevenness and marks |  | B | A | A | A | C | B |
|  | Repelling |  | B | A | B | A | B | B |
| Film-forming properties | Void trace |  | B | A | B | A | B | B |
|  | Surface unevenness and marks |  | B | A | C | A | C | B |

TABLE 6

|  |  |  | Comparative Example 4 | Comparative Example 5 | Comparative Example 6 |  |
|---|---|---|---|---|---|---|
| Polyimide precursor composition |  |  | Y-1 | Y-2 | Y-3 | Y-7 |
| Polymerization step | Tetracarboxylic dianhydride | Chemical species | BPDA | BPDA | BPDA |  |
|  |  | g | 72.72 | 72.72 | 72.72 |  |
|  |  | mmol | 247.16 | 247.16 | 247.16 |  |
|  | Diamine compound | Chemical species | PDA | PDA | PDA |  |
|  |  | g | 27.28 | 27.28 | 27.28 |  |
|  |  | mmol | 252.27 | 252.27 | 252.27 |  |
|  | Tetracarboxylic dianhydride/ diamine compound (molar ratio) |  | 0.98 | 0.98 | 0.98 |  |
|  | Organic amine compound | Chemical species | — | MMO | MMO |  |
|  |  | g | — | 51.03 | 15.00 |  |
|  |  | mmol | — | 494.32 | 148.30 |  |
|  | Processing ratio | mol % | — | 100 | 30 |  |
|  | Solvent | Chemical species | NMP | Water | Water |  |
|  |  | g | 900 | 900 | 900 |  |
|  | Polyimide precursor solid content | % | 13 | 13 | 13 |  |
|  | Liquid state |  | Dissolution | Dissolution | Dissolution |  |
|  | Imidation ratio | % | 0.02 | 0.02 | 0.02 |  |
|  | Molecular weight | Mn | 20000 | 20000 | 20000 |  |
|  | Polyimide precursor solid content | % | 9.1 | 9.1 | 9.1 |  |
|  | Viscosity | Pa·s | 120 | 60 | 64 |  |
|  | Terminal amino group |  | Containing | Containing | Containing |  |
|  | Surfactant | Trade name | QUARTAMIN 24P | — | — |  |
|  |  | Effective component | LTMAC | — | — |  |
|  |  | % | 0.01 | — | — |  |
| Storage stability | Storage condition |  | Immediately after preparation | At 50° C. for 24 hours | At room temperature for 20 days | At room temperature for 20 days |
|  | Liquid state |  | Dissolution | Precipitation | Gelation | Gelation |
|  | Viscosity | Pa·s | 120 | — | — |  |
| Coating stability | Surface unevenness and marks |  | C | — | — |  |
|  | Repelling |  | C | — | — |  |
| Film-forming properties | Void trace |  | C | — | — |  |
|  | Surface unevenness and marks |  | C | — | — |  |

TABLE 7

| Tester | A | B | C | D | E | F | G | H | I | J |
|---|---|---|---|---|---|---|---|---|---|---|
| ODOR TEST (1) | | | | | | | | | | |
| Gender | Male | Female | Male | Female | Female | Male | Female | Male | Female | Male |
| Age | 23 | 25 | 27 | 28 | 32 | 33 | 39 | 43 | 49 | 52 |
| Sample giving off bad smell | X-3 | X-3 | X-3 | X-3 | X-3 | X-3 | X-3 | X-3 | X-3 | X-3 |
| ODOR TEST (2) | | | | | | | | | | |
| Gender | Male | Female | Male | Female | Female | Male | Female | Male | Female | Male |
| Age | 23 | 25 | 27 | 28 | 32 | 33 | 39 | 43 | 49 | 52 |
| Sample giving off bad smell | Y-3 | Y-3 | Y-3 | Y-3 | Y-3 | Y-3 | Y-3 | Y-3 | Y-3 | Y-3 |

From the above results, in the present example, it is found that excellent results are obtained from the evaluation of the storage stability of the polyimide precursor composition compared to the comparative examples.

In addition, in the present example, it is found that excellent results are also obtained from the evaluation of the coating stability and the film-forming properties of the polyimide precursor composition compared to the comparative examples.

In addition, in the present example, it is also found that the odor is suppressed even in an equivalent mixing amount of the amine compound compared to the comparative examples.

Moreover, abbreviations in Tables 1 to 6 is as follows. In addition, in Tables 1 to 6, "-" means "not added" or "not performed".

Tetracarboxylic dianhydride: "BPDA" (3,3',4,4'-biphenyltetracarboxylic dianhydride), "PMDA" (pyromellitic dianhydride), "BTDA" (benzophenone tetracarboxylic dianhydride), and "CBDA" (cyclobutane-1,2,3,4-tetracarboxylic dianhydride)

Diamine compound: "ODA" (4,4'-diaminodiphenyl ether), and "PDA" (p-phenylenediamine)

Organic amine compound: DMAEt (dimethyl amino ethanol: tertiary amine compound: boiling point is bp. 133° C. to bp. 134° C.), γ-Pyc (γ-picoline: tertiary amine compound: boiling point is bp. 145° C.), MMO (methylmorpholine: tertiary amine compound), 1-methyl piperidine (tertiary amine compound: molecular weight is 99.17), N,N-dimethyl piperazine (tertiary amine compound: molecular weight is 114.19), 1-methyl pyrrolidine (tertiary amine compound: molecular weight is 85.15), and morpholine (secondary amine compound: molecular weight is 87.1)

Surfactant (cationic surfactant): LTMAC (lauryl trimethyl ammonium chloride, trade name "QUARTAMIN 24P (manufactured by Kao Corporation)"), STMAC (stearyl trimethyl ammonium chloride, trade name "QUARTAMIN 86W (manufactured by Kao Corporation)"), DSDMAC (distearyl dimethyl ammonium chloride, trade name "QUARTAMIN D86P (manufactured by Kao Corporation)"), ABDMAC (alkyl benzyl dimethyl ammonium chloride (benzalkonium chloride), and trade name "SANISOL C (manufactured by Kao Corporation)")

Solvent: THF (tetrahydrofuran: water-soluble ether-based solvent: boiling point is bp. 67° C.) and NMP (N-methyl-2-pyrrolidone)

Moreover, in the examples, "processing ratio" in the amine salification step and the polymerization step is the amount of the organic amine compound (mol %) with respect to the theoretical amount of the carboxyl group included in the polyimide precursor. Here, the theoretical amount of the carboxyl group represents a value obtained by doubling the molar amount of the tetracarboxylic acid included in the polyimide precursor.

Example 2-1

Preparation of Polyimide Precursor Compositions (A-1) and (A-2)

—Polymerization Step—

360 g of tetrahydrofuran (hereinafter, referred to as THF) and 40 g of water are filled in a flask provided with a stirring rod, a thermometer, and a dropping funnel. 41.23 g (205.92 mmol) of 4,4'-diaminodiphenyl ether (hereinafter, referred to as ODA: molecular weight is 200.24) is added thereto while a dried nitrogen gas is flowed in. While maintaining the solution temperature at 30° C., stirring is performed, and 58.77 g (199.75 mmol) of 3,3',4,4'-biphenyltetracarboxylic dianhydride (hereinafter, referred to as BPDA: molecular weight is 294.22) is gradually added. After confirming dissolution of the diamine compound and the tetracarboxylic dianhydride, a reaction is performed for 24 hours while maintaining the reaction temperature at 30° C. When a viscosity of the polyimide precursor solution (solid content is 20% by mass) is measured by the method described below, the viscosity is 70 Pa·s.

Moreover, an imidation ratio of the produced polyimide precursor is 0.02, and as a result of measuring the amount of the terminal amino group described above, the produced polyimide precursor has an amino group at least one terminal.

—Amine Salification Step—

While stirring the polyimide precursor solution obtained in the polymerization step, 35.62 g (399.5 mmol) of dimethylaminoethanol (hereinafter, referred to as DMAEt molecular weight is 89.14: organic amine compound) and 400 g of water are added. Thus, a polyimide precursor aqueous solution which is water-solubilized by amine salification of the polyimide precursor is obtained.

Polyoxyethylene oleyl ether (trade name is EMULGEN 404 (manufactured by Kao Corporation): nonionic surfactant) is added to the obtained polyimide precursor aqueous solution such that the amount of polyoxyethylene oleyl ether becomes 0.01% by mass with respect to a polyimide precursor composition to be obtained, and this solution is used as a polyimide precursor resin composition (A-1). The constitution of the obtained polyimide precursor resin composition (A-1) is as follows.

~Constitution of Polyimide Precursor Resin Composition (A-1)~
  Solid content: 10% (solid content fraction as polyimide)
  Solvent composition ratio: THF/water=360 g/440 g
—Solvent Substitution Step—
  While stirring the polyimide precursor resin composition (A-1), the pressure is reduced at 10 mmHg/30° C., and a part of THF is distilled off, whereby a polyimide precursor resin composition (A-2) having the following constitution is obtained.
~Constitution of Polyimide Precursor Resin Composition (A-2)~
  Viscosity: 50 Pa·s
  Solid content: 13.0% (solid content fraction as polyimide)
  Solvent composition ratio: THF/water=6/94
  Moreover, each measurement is as follows.
(Viscosity Measurement Method)
  Viscosity is measured under the following conditions using an E-type rotational viscometer.
    Measurement apparatus: E-type rotational viscometer TV-20H (Toki Sangyo Co., Ltd.)
    Measurement probe: No. 3 type rotor 3°×R14
    Measurement temperature: 22° C.
(Solid Content Measurement Method)
  The solid content is measured under the following conditions using a differential thermal gravimetric simultaneous measurement apparatus. Moreover, the solid content is measured as a solid content fraction as polyimide with a measured value at 380° C.
    Measurement apparatus: Differential thermal gravimetric simultaneous measurement apparatus TG/DTA6200 (Seiko Instruments Inc.)
    Measurement range: 20° C. or higher and 400° C. or lower
    Temperature raising rate: 20° C./min
(Solvent Constitution and Water Content in Solvent)
  A water content in the polyimide precursor composition is measured under the following conditions using a coulometric titration method automatic water content measurement apparatus (Karl Fischer). By excluding values derived from the resin content included in the sample from the measured values, the water content in the solvent was calculated. Thus, a solvent constitution is obtained.
    Measurement apparatus: Coulometric titration method automatic water content measurement apparatus (Karl Fischer) CA-07 type (Mitsubishi Chemical Corporation)
    Amount of sample: 10 µl
<Evaluation>
  Storage stability of the obtained polyimide precursor compositions (A-1) and (A-2) is evaluated. In addition, a film is prepared using the polyimide precursor compositions (A-1) and (A-2), and the coating stability and the film-forming properties thereof are evaluated.
(Storage Stability)
  Liquid properties and the viscosity immediately after preparation of the polyimide precursor compositions (A-1) and (A-2), and after storing at room temperature (25° C.) for 20 days are examined.
(Coating Stability)
  A film is formed by the following operation using the polyimide precursor compositions (A-1) and (A-2). (1) Surface unevenness and marks, and (2) repelling of a coating film immediately after coating are evaluated.
    Coating method: A bar coating method by which a film is formed such that the coating thickness becomes 100 µm using a coating blade provided with a spacer.
    Coating substrate: 1.1 mmt glass plate
    Drying temperature: 60° C.×10 min
    Firing temperature: 250° C.×30 min
(1) Surface Unevenness and Marks
  The presence or absence of the surface unevenness and marks that occur on the surface of the coating film is evaluated. The evaluation criteria are as follows.
  A: Occurrence of the surface unevenness and marks is not observed.
  B: The surface unevenness and marks can be slightly confirmed on a part of the surface of the coating film (less than 10% of the coating film surface area).
  C: The surface unevenness and marks can be confirmed on a part of the surface of the coating film.
  D: The surface unevenness and marks uniformly occur on the surface of the coating film (10% or greater of the coating film surface area).
(2) Repelling
  The presence of absence of repelling that occurs on the coating surface is evaluated. The evaluation criteria are as follows.
  A: Occurrence of the repelling is not observed.
  B: The repelling can be slightly confirmed on a part of the surface of the coating film (less than 5% of the coating film surface area).
  C: The repelling can be confirmed on a part of the surface of the coating film.
  D: The repelling uniformly occurs on the surface of the coating film (15% or greater of the coating film surface area).
(Film-Forming Properties)
  A film was formed by the following operation using the polyimide precursor compositions (A-1) and (A-2). (3) A void trace and (4) the surface unevenness and marks of the formed coating film were evaluated.
(3) Void Trace
  The presence of absence of the void trace on the formed film surface was evaluated. The evaluation criteria are as follows.
  A: Occurrence of the void trace is not observed.
  B: The void traces of one or more and less than 10 can be confirmed on the formed film surface.
  C: The void traces of 10 or more and less than 50 can be confirmed on the formed film surface.
  D: A large number of the void traces uniformly occur on the formed film surface.
(4) Surface Unevenness and Marks:
  The presence or absence of the surface unevenness and marks that occur on the surface of the formed coating film is evaluated. The evaluation criteria are as follows.
  A: Occurrence of the surface unevenness and marks is not observed.
  B: The surface unevenness and marks can be slightly confirmed on a part of the formed film surface (less than 10% of the formed film surface area).
  C: The surface unevenness and marks can be confirmed on a part of the formed film surface.
  D: The surface unevenness and marks uniformly occur on the formed film surface (10% or greater of the formed film surface area).

Examples 2-2 to 2-6

Preparation of Polyimide Precursor Compositions (A-3) to (A-7)

Polyimide precursor compositions (A-3) to (A-7) are prepared in the same manner as in Example 2-1 except that the conditions of the polymerization step and the amine salification step of the polyimide precursor composition, and the solvent substitution step are changed to the conditions described in the following Table 2-1.

Then, after the storage stability is evaluated in the same manner as in Example 2-1, a film is formed, and the coating stability and the film-forming properties thereof are evaluated. The evaluation results are shown in Table 2-1.

Comparative Example 2-1

Preparation of Polyimide Precursor Compositions (X-1) and (X-2)

400 g of N-methyl-2-pyrrolidone (hereinafter, referred to as NMP) is filled in a flask provided with a stirring rod, a thermometer, and a dropping funnel. 41.23 g (205.92 mmol) of ODA is added thereto while a dried nitrogen gas is flowed in. While maintaining the solution temperature at 30° C., stirring is performed, and 58.77 g (199.75 mmol) of BPDA is gradually added. After confirming dissolution of the diamine compound and the tetracarboxylic dianhydride, a reaction is performed for 24 hours while maintaining the reaction temperature at 30° C. When a viscosity of the polyimide precursor solution (solid content is 20% by mass) is measured by the method described above, the viscosity is 160 Pa·s.

Polyoxyethylene oleyl ether (trade name is EMULGEN 404 (manufactured by Kao Corporation): nonionic surfactant) is added to the obtained polyimide precursor aqueous solution such that the amount of polyoxyethylene oleyl ether becomes 0.01% by mass with respect to a polyimide precursor composition to be obtained, and this solution is used as a polyimide precursor composition (X-1).

Then, after the storage stability is evaluated in the same manner as in Example 2-1, a film is formed, and the coating stability and the film-forming properties thereof are evaluated. The evaluation results are shown in Table 2-2.

Moreover, each of the obtained polyimide precursor composition (X-1) and the (A-1) obtained in Example 2-1 is stored for 24 hours in an environment of 50° C. The (X-1) after storing is used as (X-2). When comparing the liquid states of the (X-2) and (A-1), in the (A-1), a resin is dissolved in a nearly uniform state and stable, however, in the (X-2), a resin is precipitated. It is considered that since imidization is proceeded when the storage temperature is set to 50° C., the resin is precipitated.

Example 2-7

Preparation of Polyimide Precursor Composition (B-1)

—Polymerization Step—

900 g of water is filled in a flask provided with a stirring rod, a thermometer, and a dropping funnel. Here, 27.28 g (252.27 mmol) of p-phenylenediamine (hereinafter, referred to as PDA: molecular weight is 108.14) and 50.00 g (494.32 mmol) of methylmorpholine (hereinafter, referred to as MMO: organic amine compound) are added, and the resultant mixture is stirred at 20° C. for 10 minutes to disperse. Polyoxyethylene oleyl ether (trade name is EMULGEN 404 (manufactured by Kao Corporation): nonionic surfactant) is added to the solution such that the amount of polyoxyethylene oleyl ether becomes 0.01% by mass with respect to a polyimide precursor composition to be obtained. In addition, 72.72 g (247.16 mmol) of 3,3',4,4'-biphenyltetracarboxylic dianhydride (hereinafter referred to as BPDA: molecular weight is 294.22) is added to the solution, the resultant mixture is stirred to dissolve for 24 hours while maintaining the reaction temperature at 20° C., and the reaction is performed, whereby a polyimide precursor aqueous solution (B-1) is obtained.

Then, after the storage stability is evaluated in the same manner as in Example 2-1, a film is formed, and the coating stability and the film-forming properties thereof are evaluated. The evaluation results are shown in Table 2-3.

Moreover, an imidation ratio of the produced polyimide precursor is 0.02, and as a result of measuring the amount of the terminal amino group described above, the produced polyimide precursor has an amino group at least a terminal.

Examples 2-8 to 2-22

Preparation of Polyimide Precursor Compositions (B-2) to (B-16)

Polyimide precursor compositions (B-2) to (B-16) are prepared in the same manner as in Example 2-7 except that the conditions of the polymerization step of the polyimide precursor composition are changed to the conditions described in Tables 2-3 to 2-5.

Then, after the storage stability is evaluated in the same manner as in Example 2-1, a film is formed, and the coating stability and the film-forming properties thereof are evaluated. The evaluation results are described in Tables 2-3 to 2-5.

Moreover, as a result of the measurement of the terminal amino group amount described above, the polyimide precursor produced in Example 2-22 does not include the amino group terminal, however, the entire terminals of the polyimide precursor has carboxyl groups.

Comparative Example 2-3

Preparation of Polyimide Precursor Composition (Y-1)

—Polymerization Step—

900 g of NMP is filled in a flask provided with a stirring rod, a thermometer, and a dropping funnel. Here, 27.28 g (252.27 mmol) of PDA is added thereto, and the resultant mixture is stirred to disperse at 20° C. for 10 minutes. 72.72 g (247.16 mmol) of BPDA is added to the solution, the resultant mixture is stirred to dissolve for 24 hours while maintaining the reaction temperature at 20° C., and the reaction is performed, whereby a polyimide precursor aqueous solution is obtained.

Polyoxyethylene oleyl ether (trade name is EMULGEN 404 (manufactured by Kao Corporation): nonionic surfactant) is added to the obtained polyimide precursor aqueous solution such that the amount of polyoxyethylene oleyl ether becomes 0.01% by mass with respect to a polyimide precursor composition to be obtained, and this solution is used as a polyimide precursor composition (Y-1).

Then, after the storage stability is evaluated in the same manner as in Example 2-1, a film is formed, and the coating stability and the film-forming properties thereof are evaluated. The evaluation results are shown in Table 2-2.

Moreover, each of the obtained polyimide precursor composition (Y-1) and the (B-1) obtained in Example 2-7 is stored for 24 hours in an environment of 50° C. The (Y-1) after storing is used as (Y-2). When comparing the liquid states of the (Y-2) and (B-1), in the (A-1), a resin is dissolved in a nearly uniform state and stable, however, in the (Y-2), a resin is precipitated. It is considered that since imidization is proceeded when the storage temperature was set to 50° C., the resin is precipitated.

Comparative Example 2-5

Preparation of Polyimide Precursor Composition (Y-4)

A polyimide precursor composition (Y-4) is prepared in the same manner as in Example 2-7 except that the conditions of the polymerization step of the polyimide precursor composition are changed to the conditions described in Table 2-6.

Then, after the storage stability is evaluated in the same manner as in Example 2-1, a film is formed, and the coating stability and the film-forming properties thereof are evaluated. The evaluation results are shown in Table 2-6.

Comparative Example 2-6

Preparation of Polyimide Precursor Composition (Y-5)

A polyimide precursor composition (Y-5) is prepared in the same manner as in Example 2-7 except that the conditions of the polymerization step of the polyimide precursor composition are changed to the conditions described in Table 2-6.

When confirming the solution properties of the (Y-5) after storing at room temperature (25° C.) for 20 days, gelation is proceeded, and therefore, the coating stability and the film-forming properties thereof is not possible to be evaluated.

Comparative Example 2-7

Preparation of Polyimide Precursor Composition (Y-6)

A polyimide precursor composition (Y-6) is prepared in the same manner as in Example 2-7 except that the conditions of the polymerization step of the polyimide precursor composition are changed to the conditions described in Table 2-6.

Then, after the storage stability is evaluated in the same manner as in Example 2-1, a film is formed, and the coating stability and the film-forming properties thereof were evaluated. The evaluation results are shown in Table 2-6.

TABLE 2-1

| | | | Example 2-1 | Example 2-2 | Example 2-3 | Example 2-4 | Example 2-5 | Example 2-6 |
|---|---|---|---|---|---|---|---|---|
| Polyimide precursor composition | | | A-1 | A-2 | A-3 | A-4 | A-5 | A-6 |
| Polymerization step | Tetracarboxylic dianhydride | Chemical species | BPDA | BPDA | BPDA | BPDA | BPDA | BPDA |
| | | g | 58.77 | 58.77 | 58.77 | 58.77 | 58.77 | 72.52 |
| | | mmol | 199.75 | 199.75 | 199.75 | 199.75 | 199.75 | 246.48 |
| | Diamine compound | Chemical species | ODA | ODA | ODA | ODA | ODA | PDA |
| | | g | 41.23 | 41.23 | 41.23 | 41.23 | 41.23 | 27.48 |
| | | mmol | 205.92 | 205.92 | 205.92 | 205.92 | 205.92 | 254.12 |
| | Tetracarboxylic dianhydride/diamine compound (molar ratio) | | 0.98 | 0.98 | 0.98 | 0.98 | 0.98 | 0.98 |
| | Solvent 1 | Chemical species | THF | THF | THF | THF | THF | THF |
| | | g | 360 | 360 | 360 | 360 | 360 | 360 |
| | Solvent 2 | Chemical species | Water | Water | Water | Water | Water | Water |
| | | g | 40 | 40 | 40 | 40 | 40 | 40 |
| | Solvent 1/solvent 2 | | 9/1 | 9/1 | 9/1 | 9/1 | 9/1 | 9/1 |
| | Liquid state | | Dissolution | Dissolution | Dissolution | Dissolution | Dissolution | Dissolution |
| | Imidation ratio | % | 0.02 | 0.02 | 0.02 | 0.02 | 0.02 | 0.08 |
| | Molecular weight | Mn | 20000 | 20000 | 20000 | 20000 | 20000 | 20000 |
| | Polyimide precursor solid content | % | 20 | 20 | 20 | 20 | 20 | 20 |
| | Viscosity | Pa·s | 70 | 70 | 70 | 70 | 70 | 70 |
| Amine salification step | Organic amine compound | Chemical species | DMAEt | DMAEt | DMAEt | DMAEt | γ-Pyc | DMAEt |
| | | g | 35.62 | 35.62 | 17.82 | 178.1 | 58.08 | 35.62 |
| | | mmol | 399.5 | 399.5 | 199.76 | 1997.5 | 399.5 | 399.5 |
| | Added solvent | Chemical species | Water | Water | Water | Water | Water | Water |
| | | g | 400 | 400 | 400 | 400 | 400 | 400 |
| | Processing ratio | mol % | 100 | 100 | 50 | 500 | 100 | 100 |

| | | | Example 2-6 |
|---|---|---|---|
| Polyimide precursor composition | | | A-7 |
| Polymerization step | Tetracarboxylic dianhydride | Chemical species | BPDA |
| | | g | 58.77 |
| | | mmol | 199.75 |
| | Diamine compound | Chemical species | ODA |
| | | g | 41.23 |
| | | mmol | 205.92 |
| | Tetracarboxylic dianhydride/diamine compound (molar ratio) | | 0.98 |
| | Solvent 1 | Chemical species | THF |
| | | g | 320 |
| | Solvent 2 | Chemical species | Water |
| | | g | 80 |
| | Solvent 1/solvent 2 | | 8/2 |
| | Liquid state | | Dissolution |
| | Imidation ratio | % | 0.03 |
| | Molecular weight | Mn | 15000 |
| | Polyimide precursor solid content | % | 20 |
| | Viscosity | Pa·s | 100 |
| Amine salification step | Organic amine compound | Chemical species | DMAEt |
| | | g | 35.62 |
| | | mmol | 399.5 |
| | Added solvent | Chemical species | Water |
| | | g | 400 |
| | Processing ratio | mol % | 100 |

TABLE 2-1-continued

|  |  |  | Example 2-1 | Example 2-2 | Example 2-3 | Example 2-4 | Example 2-5 | Example 2-6 | Example 2-7 |
| --- | --- | --- | --- | --- | --- | --- | --- | --- | --- |
| Solvent substitution step | Liquid state |  | Dissolution | Dissolution | Dissolution | Dissolution | Dissolution | Dissolution | Dissolution |
|  | Liquid state |  | — | Dissolution | Dissolution | Dissolution | Dissolution | Dissolution | Dissolution |
|  | Polyimide solid content | % | — | 13 | 13 | 13 | 13 | 18 | 18 |
|  | Viscosity | Pa·s | — | 50 | 120 | 35 | 90 | 85 | 98 |
|  | Water content in solvent | % | — | 94 | 98 | 86 | 92 | 92 | 96 |
| Surfactant | Trade name |  | EMULGEN 404 | EMULGEN 404 | EMULGEN 404 | EMULGEN 404 | EMULGEN 404 | EMULGEN 404 | EMULGEN 404 |
|  | Effective component |  | POE-OE | POE-OE | POE-OE | POE-OE | POE-OE | POE-OE | POE-OE |
|  | Added amount | % | 0.01 | 0.01 | 0.01 | 0.01 | 0.01 | 0.01 | 0.01 |
| Storage stability | Storage condition |  | At room temperature for 20 days | At room temperature for 20 days | At room temperature for 20 days | At room temperature for 20 days | At room temperature for 20 days | At room temperature for 20 days | At room temperature for 20 days |
|  | Liquid state |  | Dissolution | Dissolution | Dissolution | Dissolution | Dissolution | Dissolution | Dissolution |
|  | Viscosity | Pa·s | 80 | 56 | 135 | 42 | 95 | 88 | 100 |
| Coating stability | Surface unevenness and marks |  | A | A | B | A | A | A | A |
|  | Repelling |  | A | A | B | B | A | A | A |
| Film-forming property | Void trace |  | A | A | B | B | B | A | A |
|  | Surface unevenness and marks |  | A | A | B | A | B | A | A |

TABLE 2-2

|  |  |  | Example-Comparative Example Comparative Example 2-1 | |
| --- | --- | --- | --- | --- |
| Polyimide precursor composition |  |  | X-1 | X-2 |
| Polymerization step | Tetracarboxylic dianhydride | Chemical species | BPDA | |
|  |  | g | 58.77 | |
|  |  | mmol | 199.75 | |
|  | Diamine compound | Chemical species | ODA | |
|  |  | g | 41.23 | |
|  |  | mmol | 205.92 | |
|  | Tetracarboxylic dianhydride/diamine compound (molar ratio) |  | 0.98 | |
|  | Solvent 1 | Chemical species | NMP | |
|  |  | g | 400 | |
|  | Solvent 2 | Chemical species | — | |
|  |  | g | — | |
|  | Solvent 1/solvent 2 |  | 10/0 | |
|  | Liquid state |  | Dissolution | |
|  | Imidation ratio | % | 0.02 | |
|  | Molecular weight | Mn | 12000 | |
|  | Polyimide precursor solid content | % | 20 | |
|  | Viscosity | Pa·s | 160 | |
| Amine salification step | Organic amine compound | Chemical species | — | |
|  |  | g | — | |
|  |  | mmol | — | |
|  | Added solvent | Chemical species | — | |
|  |  | g | — | |
|  | Processing ratio | mol % | — | |
|  | Liquid state |  | — | |
| Solvent substitution step | Liquid state |  | — | |
|  | Polyimide solid content | % | — | |
|  | Viscosity | Pa·s | — | |
|  | Water content in solvent | % | — | |
| Surfactant | Trade name |  | EMULGEN 404 | |
|  | Effective component |  | POE-OE | |
|  | Added amount | % | 0.01 | |
| Storage stability | Storage condition |  | Immediately after manufacture | At 50° C. for 24 hours |
|  | Liquid state |  | Dissolution | Precipitation |
|  | Viscosity | Pa·s | 160 | — |
| Coating stability | Surface unevenness and marks |  | C | — |
|  | Repelling |  | C | — |
| Film-forming property | Void trace |  | C | — |
|  | Surface unevenness and marks |  | C | — |

TABLE 2-3

| | | | Example 2-7 | Example 2-8 | Example 2-9 | Example 2-10 | Example 2-11 | Example 2-12 |
|---|---|---|---|---|---|---|---|---|
| Polyimide precursor composition | | | B-1 | B-2 | B-3 | B-4 | B-5 | B-6 |
| Polymerization step | Tetracarboxylic dianhydride | Chemical species | BPDA | BPDA | BPDA | BPDA | BPDA | BPDA |
| | | g | 72.72 | 72.72 | 72.72 | 72.72 | 72.72 | 72.72 |
| | | mmol | 247.16 | 247.16 | 247.16 | 247.16 | 247.16 | 247.16 |
| | Diamine compound | Chemical species | PDA | PDA | PDA | PDA | PDA | PDA |
| | | g | 27.28 | 27.28 | 27.28 | 27.28 | 27.28 | 27.28 |
| | | mmol | 252.27 | 252.27 | 252.27 | 252.27 | 252.27 | 252.27 |
| | Tetracarboxylic dianhydride/diamine compound (molar ratio) | | 0.98 | 0.98 | 0.98 | 0.98 | 0.98 | 0.98 |
| | Organic amine compound | Chemical species | MMO | MMO | MMO | MMO | MMO | MMO |
| | | g | 50.00 | 50.00 | 50.00 | 50.00 | 50.00 | 50.00 |
| | | mmol | 494.32 | 494.32 | 494.32 | 494.32 | 494.32 | 494.32 |
| | Processing ratio | mol % | 100 | 100 | 100 | 101 | 100 | 100 |
| | Solvent | Chemical species | Water | Water | Water | Water | Water | Water |
| | | g | 900 | 900 | 900 | 900 | 900 | 900 |
| | Polyimide precursor solid content | % | 13 | 13 | 13 | 13 | 13 | 13 |
| | Liquid state | | Dissolution | Dissolution | Dissolution | Dissolution | Dissolution | Dissolution |
| | Imidation ratio | % | 0.02 | 0.02 | 0.02 | 0.02 | 0.02 | 0.02 |
| | Molecular weight | Mn | 20000 | 20000 | 20000 | 20000 | 20000 | 20000 |
| | Polyimide solid content | % | 9.1 | 9.1 | 9.1 | 9.1 | 9.1 | 9.1 |
| | Viscosity | Pa · s | 60 | 60 | 60 | 60 | 55 | 62 |
| | Terminal amino group | | Containing | Containing | Containing | Containing | Containing | Containing |
| | Surfactant | Trade name | EMULGEN 404 | EMANON 4110 | Newcol 80 | RHEODOL SUPER TW-L120 | EMULGEN 404 | EMULGEN 404 |
| | | Effective Component | POE-OE | PEG-MO | Sor-MO | POE-Sor-ML | POE-OE | POE-OE |
| | | % | 0.01 | 0.01 | 0.01 | 0.01 | 0.1 | 0.001 |
| Storage stability | Storage condition | | At room temperature for 20 days | At room temperature for 20 days | At room temperature for 20 days | At room temperature for 20 days | At room temperature for 20 days | At room temperature for 20 days |
| | Liquid state | | Dissolution | Dissolution | Dissolution | Dissolution | Dissolution | Dissolution |
| | Viscosity | Pa · s | 62 | 70 | 65 | 70 | 62 | 80 |
| Coating stability | Surface unevenness and marks | | A | A | A | A | B | B |
| | Repelling | | A | A | A | A | B | B |
| Film-forming property | Void trace | | A | B | B | A | B | B |

TABLE 2-4

| | | | Example 2-13 | Example 2-14 | Example 2-15 | Example 2-16 |
|---|---|---|---|---|---|---|
| Polyimide precursor composition | | | B-7 | B-8 | B-9 | B-10 |
| Polymerization step | Tetracarboxylic dianhydride | Chemical species | BPDA | PMDA | BTDA | BPDA |
| | | g | 58.9 | 51.52 | 74.32 | 72.72 |
| | | mmol | 200.24 | 236.21 | 223.7 | 247.16 |
| | Diamine compound | Chemical species | ODA | ODA | PDA | PDA |
| | | g | 40.9 | 48.24 | 25.45 | 27.28 |
| | | mmol | 204.27 | 240.92 | 235.35 | 252.27 |
| | Tetracarboxylic dianhydride/diamine compound (molar ratio) | | 0.98 | 0.98 | 0.98 | 0.98 |
| | Organic amine compound | Chemical species | MMO | MMO | MMO | MMO |
| | | g | 40.51 | 47.79 | 47.61 | 25.00 |
| | | mmol | 400.48 | 472.42 | 447.4 | 247.16 |
| | Processing ratio | mol % | 100 | 100 | 100 | 50 |
| | Solvent | Chemical species | Water | Water | Water | Water |
| | | g | 900 | 900 | 900 | 900 |
| | Polyimide precursor solid content | % | 13 | 13 | 13 | 13 |

TABLE 2-4-continued

|  |  |  | Example-Comparative Example | | | |
|---|---|---|---|---|---|---|
|  |  |  | Example 2-13 | Example 2-14 | Example 2-15 | Example 2-16 |
|  | Liquid state |  | Dissolution | Dissolution | Dissolution | Dissolution |
|  | Imidation ratio | % | 0.02 | 0.02 | 0.02 | 0.02 |
|  | Molecular weight | Mn | 20000 | 20000 | 20000 | 20000 |
|  | Polyimide solid content | % | 9.1 | 9.3 | 9.2 | 9.1 |
|  | Viscosity | Pa · s | 40 | 40 | 30 | 100 |
|  | Terminal amino group |  | Containinng | Containing | Containing | Containing |
|  | Surfactant | Trade name | EMULGEN 404 | EMULGEN 404 | EMULGEN 404 | EMULGEN 404 |
|  |  | Effective Component |  POE-OE | POE-OE | POE-OE | POE-OE |
|  |  | % | 0.01 | 0.01 | 0.01 | 0.01 |
| Storage stability | Storage condition |  | At room temperature for 20 days | At room temperature for 20 days | At room temperature for 20 days | At room temperature for 20 days |
|  | Liquid state |  | Dissolution | Dissolution | Dissolution | Dissolution |
|  | Viscosity | Pa · s | 66 | 65 | 72 | 70 |
| Coating stability | Surface unevenness and marks |  | A | A | B | B |
|  | Repelling |  | A | A | B | B |
| Film-forming property | Void trace |  | A | A | B | B |

TABLE 2-5

|  |  |  | Example-Comparative Example | | | | | |
|---|---|---|---|---|---|---|---|---|
|  |  |  | Example 2-17 | Example 2-18 | Example 2-19 | Example 2-20 | Example 2-21 | Example 2-22 |
| Polyimide precursor composition |  |  | B-11 | B-12 | B-13 | B-14 | B-15 | B-16 |
| Polymerization step | Tetracarboxylic dianhydride | Chemical species | BPDA | BPDA | BPDA | PMDA | BPDA | CBDA |
|  |  | g | 72.72 | 72.72 | 72.72 | 51.52 | 72.72 | 67.46 |
|  |  | mmol | 247.16 | 247.16 | 247.16 | 236.21 | 247.16 | 290.60 |
|  | Diamine compound | Chemical species | PDA | PDA | PDA | ODA | PDA | 1,6-Cyclo-hexane-diamine |
|  |  | g | 27.28 | 27.28 | 27.28 | 48.24 | 27.28 | 32.54 |
|  |  | mmol | 252.27 | 252.27 | 252.27 | 240.92 | 252.27 | 284.96 |
|  | Tetracarboxylic dianhydride/diamine compound (molar ratio) |  | 0.98 | 0.98 | 0.98 | 0.98 | 0.98 | 1.02 |
|  | Organic amine compound | Chemical species | MMO | 1-Metyl piperidine | N,N-Dimethyl piperazine | 1-Methyl pyrrolidine | Morpholine | MMO |
|  |  | g | 250.00 | 50.00 | 50.00 | 47.79 | 43.07 | 58.79 |
|  |  | mmol | 2471.6 | 494.32 | 494.32 | 472.42 | 494.32 | 581.20 |
|  | Processing ratio | mol % | 500 | 100 | 100 | 100 | 100 | 100 |
|  | Solvent | Chemical species | Water | Water | Water | Water | Water | Water |
|  |  | g | 900 | 900 | 900 | 900 | 900 | 900 |
|  | Polyimide solid content | % | 13 | 13 | 13 | 13 | 13 | 13 |
|  | Liquid state |  | Dissolution | Dissolution | Dissolution | Dissolution | Dissolution | Dissolution |
|  | Imidation ratio | % | 0.02 | 0.05 | 0.05 | 0.06 | 0.02 | 0.02 |
|  | Molecular weight | Mn | 20000 | 100000 | 20000 | 20000 | 20000 | 20000 |
|  | Polyimide precursor solid content | % | 9.1 | 9.1 | 9.1 | 9.3 | 9.1 | 9.1 |
|  | Viscosity | Pa · s | 10 | 40 | 40 | 20 | 60 | 30 |
|  | Terminal amino group |  | Containing | Containing | Containing | Containing | Containing | Not detected |
|  | Surfactant | Trade name | EMULGEN 404 | EMULGEN 404 | EMULGEN 404 | EMULGEN 404 | EMULGEN 404 | EMULGEN 404 |
|  |  | Effective component | POE-OE | POE-OE | POE-OE | POE-OE | POE-OE | POE-OE |
|  |  | % | 0.01 | 0.01 | 0.01 | 0.01 | 0.01 | 0.01 |
| Storage stability | Storage condition |  | At room temperature for 20 days | At room temperature for 20 days | At room temperature for 20 days | At room temperature for 20 days | At room temperature for 20 days | At room temperature for 20 days |
|  | Liquid state |  | Dissolution | Dissolution | Dissolution | Dissolution | Dissolution | Dissolution |
|  | Viscosity | Pa · s | 50 | 60 | 72 | 40 | 125 | 45 |

TABLE 2-5-continued

| | | Example-Comparative Example | | | | | |
|---|---|---|---|---|---|---|---|
| | | Example 2-17 | Example 2-18 | Example 2-19 | Example 2-20 | Example 2-21 | Example 2-22 |
| Coating stability | Surface unevenness and marks | B | A | A | A | C | B |
| | Repelling | B | A | B | A | B | B |
| Film-forming property | Void trace | B | A | B | A | B | B |

TABLE 2-6

| | | | Example-Comparative Example | | | |
|---|---|---|---|---|---|---|
| | | | Comparative Example 2-3 | Comparative Example 2-5 | Comparative Example 2-6 | Comparative Example 2-7 |
| Polyimide precursor composition | | | Y-1 Y-2 | Y-4 | Y-5 | Y-6 |
| Polymerization step | Tetracarboxylic dianhydride | Chemical species | BPDA | PMDA | BTDA | BPDA |
| | | g | 72.72 | 51.52 | 74.32 | 58.9 |
| | | mmol | 247.16 | 236.21 | 223.7 | 200.24 |
| | Diamine compound | Chemical species | PDA | ODA | PDA | ODA |
| | | g | 27.28 | 48.24 | 25.45 | 40.9 |
| | | mmol | 252.27 | 240.92 | 235.35 | 204.27 |
| | Tetracarboxylic dianhydride/diamine compound (molar ratio) | | 0.98 | 0.98 | 0.98 | 0.98 |
| | Organic amine compound | Chemical species | — | MMO | MMO | MMO |
| | | g | — | 47.79 | 47.61 | 40.51 |
| | | mmol | — | 472.42 | 447.4 | 400.48 |
| | Processing ratio | mol % | — | 100 | 100 | 100 |
| | Solvent | Chemical species | NMP | Water | Water | Water |
| | | g | 900 | 900 | 900 | 900 |
| | Polyimide solid content | % | 13 | 13 | 13 | 13 |
| | Liquid state | | Dissolution | Dissolution | Dissolution | Dissolution |
| | Imidation ratio | % | 0.02 | 0.02 | 0.02 | 0.02 |
| | Molecular weight | Mn | 20000 | 20000 | 20000 | 20000 |
| | Polyimide precursor solid content | % | 9.1 | 9.3 | 9.2 | 9.1 |
| | Viscosity | Pa·s | 120 | 50 | 80 | 85 |
| | Terminal amino group | | Containing | Containing | Containing | Containing |
| | Surfactant | Trade name | EMULGEN 404 | — | — | — |
| | | Effective Component % | POE-OE 0.01 | — | — | — |
| Storage stability | Storage condition | | Immediately after manufacture | At 50° C. for 20 days | At room temperature for 20 days | At room temperate for 20 days | At room temperature for 20 days |
| | Liquid state | | Dissolution | Precipitate | Dissolution | Gelation | Dissolution |
| | Viscosity | Pa·s | 120 | — | 170 | Gelation | 200 |
| Coating stability | Surface unevenness and marks | | C | — | C | — | D |
| | Repelling | | C | — | C | — | D |
| Film-forming property | Void trace | | C | — | D | — | D |

From the above results, in the present examples, it is found that excellent results are obtained from the evaluation of the storage stability of the polyimide precursor composition compared to the comparative examples.

In addition, in the present examples, it is found that excellent results are also obtained from the evaluation of the coating stability and the film-forming properties of the polyimide precursor composition compared to the comparative examples.

Moreover, abbreviations in Tables 2-1 to 2-6 are as follows. In addition, in Tables 2-1 to 2-6, "-" means "not added" or "not performed".

Tetracarboxylic dianhydride: "BPDA" (3,3',4,4'-biphenyltetracarboxylic dianhydride), "PMDA" (pyromellitic dianhydride), "BTDA" (benzophenone tetracarboxylic dianhydride), and "CBDA" (cyclobutane-1,2,3,4-tetracarboxylic dianhydride)

Diamine compound: "ODA" (4,4'-diaminodiphenyl ether), and "PDA" (p-phenylenediamine)

Organic amine compound: DMAEt (dimethyl amino ethanol: tertiary amine compound: boiling point is bp. 133° C. to bp. 134° C.), γ-Pyc (γ-picoline: tertiary amine compound: boiling point is bp. 145° C.), MMO (methylmorpholine: tertiary amine compound), 1-methyl piperidine (tertiary amine compound: molecular weight is 99.17), N,N-dimethyl piperazine (tertiary amine compound: molecular weight is 114.19), 1-methyl pyrrolidine (tertiary amine compound: molecular weight is 85.15), and morpholine (secondary amine compound: molecular weight is 87.1)

Surfactant (nonionic surfactant): POE-OE (polyoxyethylene oleyl ether, trade name "EMULGEN 404 (manufactured by Kao Corporation)"), PEG-MO (polyethylene glycol monooleate, trade name "EMANON 4110 (manufactured by Kao Corporation)"), Sor-MO (sorbitan monooleate, trade name "Newcol 80 (manufactured by Nippon Nyukazai Co., Ltd.)"), POE-Sor-ML (polyoxyethylene sorbitan monolaurate, and trade name "RHEODOL SUPER TW-L120 (manufactured by Kao Corporation)").

Solvent: THF (tetrahydrofuran: water-soluble ether-based solvent: boiling point is bp. 67° C.) and NMP (N-methyl-2-pyrrolidone)

Moreover, in the examples, "processing ratio" in the amine salification step and the polymerization step is the amount of the organic amine compound (mol %) with respect to the theoretical amount of the carboxyl group included in the polyimide precursor. Here, the theoretical amount of the carboxyl group represents a value obtained by doubling the molar amount of the tetracarboxylic acid included in the polyimide precursor.

Example 3-1

Preparation of Polyimide Precursor Compositions (A-1) and (A-2)

—Polymerization Step—

360 g of tetrahydrofuran (hereinafter, referred to as THF) and 40 g of water are filled in a flask provided with a stirring rod, a thermometer, and a dropping funnel. 41.23 g (205.92 mmol) of 4,4'-diaminodiphenyl ether (hereinafter, referred to as ODA: molecular weight is 200.24) is added thereto while a dried nitrogen gas is flowed in. While maintaining the solution temperature at 30° C., stirring is performed, and 58.77 g (199.75 mmol) of 3,3'4,4'-biphenyltetracarboxylic dianhydride (hereinafter, referred to as BPDA: molecular weight is 294.22) is gradually added. After confirming dissolution of the diamine compound and the tetracarboxylic dianhydride, a reaction is performed for 24 hours while maintaining the reaction temperature at 30° C. When a viscosity of the polyimide precursor (solid content is 20% by mass) was measured by the method described below, the viscosity is 70 Pa·s.

Moreover, an imidation ratio of the produced polyimide precursor is 0.02, and as a result of measuring the amount of the terminal amino group described above, the produced polyimide precursor has an amino group at least one terminal.

—Amine Salification Step—

While stirring the polyimide precursor solution obtained in the polymerization step, 35.62 g (399.5 mmol) of dimethylaminoethanol (hereinafter, referred to as DMAEt: molecular weight is 89.14: organic amine compound) and 400 g of water are added. Thus, a polyimide precursor aqueous solution which is water-solubilized by amine salification of the polyimide precursor is obtained.

Sodium polyoxyethylene lauryl ether sulfate (trade name is EMAL 20C (manufactured by Kao Corporation): cationic surfactant) is added to the obtained polyimide precursor aqueous solution such that the amount of sodium polyoxyethylene lauryl ether sulfate becomes 0.01% by mass with respect to a polyimide precursor composition to be obtained, and this solution is used as a polyimide precursor resin composition (A-1). The constitution of the obtained polyimide precursor resin composition (A-1) is as follows.

~Constitution of Polyimide Precursor Resin Composition (A-1)~

Solid content: 10% (solid content fraction as polyimide)
Solvent composition ratio: THF/water=360 g/440 g —Solvent Substitution Step—

While stirring the polyimide precursor resin composition (A-1), the pressure is reduced at 10 mmHg/30° C., and a part of THF was distilled off, whereby a polyimide precursor resin composition (A-2) having the following constitution is obtained.

~Constitution of Polyimide Precursor Resin Composition (A-2)~

Viscosity: 50 Pa·s
Solid content: 13.0% (solid content fraction as polyimide)
Solvent composition ratio: THF/water=6/94

Moreover, each measurement is as follows.

(Viscosity Measurement Method)

Viscosity is measured under the following conditions using an E-type rotational viscometer.

Measurement apparatus: E-type rotational viscometer TV-20H (manufactured by Toki Sangyo Co., Ltd.)
Measurement probe: No. 3 type rotor 3°×R14
Measurement temperature: 22° C.

(Solid Content Measurement Method)

The solid content is measured under the following conditions using a differential thermal gravimetric simultaneous measurement apparatus. Moreover, the solid content is measured as a solid content fraction as polyimide with a measured value at 380° C.

Measurement apparatus: Differential thermal gravimetric simultaneous measurement apparatus TG/DTA6200 (manufactured by Seiko Instruments Inc.)
Measurement range: 20° C. or higher and 400° C. or lower
Temperature raising rate: 20° C./min (Solvent Constitution and Water Content in Solvent)

A water content in the polyimide precursor composition is measured under the following conditions using a coulometric titration method automatic water content measurement apparatus (Karl Fischer). By excluding values derived from the resin content included in the sample from the measured values, the water content in the solvent is calculated. Thus, a solvent constitution is obtained.

Measurement apparatus: Coulometric titration method automatic water content measurement apparatus (Karl Fischer) CA-07 type (Mitsubishi Chemical Corporation)
Amount of sample: 10 µl <Evaluation>

In addition, a film was prepared using the obtained polyimide precursor compositions (A-1) and (A-2), and the film-forming properties thereof were evaluated. In addition, mechanical properties (tensile strength and tensile elongation) of the obtained formed coating film were measured.

(Film-Forming Property)

A film is formed by the following operation using the polyimide precursor compositions (A-1) and (A-2). (1) A void trace and (2) the surface unevenness and marks of the formed coating film are evaluated.

Coating method: A bar coating method by which a film is formed such that the coating thickness becomes 100 µm using a coating blade provided with a spacer.
Coating substrate: 1.1 mmt glass plate
Drying temperature: 60° C.×10 min
Firing temperature: 250° C.×30 min (1) Void Trace The presence of absence of the void trace on the formed film surface was evaluated. The evaluation criteria are as follows.

A: Occurrence of the void trace is not observed.
B: The void traces of one or more and less than 10 can be confirmed on the formed film surface.
C: The void traces of 10 or more and less than 50 can be scatteredly present on the formed film surface.
D: A large number of the void traces uniformly occur on the formed film surface.

(2) Surface Unevenness and Marks

The presence or absence of the surface unevenness and marks that occur on the formed film surface is evaluated. The evaluation criteria are as follows.

A: Occurrence of the surface unevenness and marks is not observed.
B: The surface unevenness and marks can be slightly confirmed on a part of the formed film surface (less than 10% of the formed film surface area).
C: The surface unevenness and marks can be confirmed on a part of the formed film surface.
D: The surface unevenness and marks uniformly occur on the formed film surface (10% or greater of the formed film surface area).

(Tensile Strength and Tensile Elongation)

A sample piece is formed from the prepared formed coating film by punching using a dumbbell No. 3. The sample piece is installed in a tension testing machine, the applied load (tensile strength) and the breaking elongation (tensile elongation) at which the sample piece is tensile-broken are measured under the following conditions.

Test apparatus: Tension testing machine 1605 type manufactured by AIKOH ENGINEERING CO., LTD.
Sample length: 30 mm
Sample width: 5 mm
Tension rate: 10 mm/min Examples 3-2 to 3-6

Preparation of Polyimide Precursor Compositions (A-3) to (A-7)

Polyimide precursor compositions (A-3) to (A-7) are prepared in the same manner as in Example 3-1 except that the conditions of the polymerization step, and the amine salification step of the polyimide precursor composition, and the solvent substitution step are changed to the conditions described in the following Table 3-1.

Then, the film-forming properties and the mechanical properties (tensile strength and tensile elongation) of the formed coating film are evaluated in the same manner as in Example 3-1. The evaluation results are shown in Table 1.

Comparative Example 3-1

Preparation of Polyimide Precursor Composition (X-1)

A polyimide precursor composition (X-1) is prepared in the same manner as in the polyimide precursor composition (A-2) in Example 3-1 except that sodium polyoxyethylene lauryl ether sulfate (cationic surfactant) is not added.

Moreover, a film of the obtained polyimide precursor composition (X-1) is formed in the same manner as in Example 3-1, and since the void trace, the surface unevenness, and marks occupied 90%/0 or more of the film, the evaluation of mechanical properties (tensile strength and tensile elongation) of the formed coating film as Example 3-1 is not performed.

Example 3-7

Preparation of Polyimide Precursor Composition (B-1)

—Polymerization Step—

900 g of water is filled in a flask provided with a stirring rod, a thermometer, and a dropping funnel. Here, 27.28 g (252.27 mmol) of p-phenylenediamine (hereinafter, referred to as PDA: molecular weight is 108.14) and 50.00 g (494.32 mmol) of methylmorpholine (hereinafter, referred to as MMO: organic amine compound) are added, and the resultant mixture is stirred at 20° C. for 10 minutes to disperse. Sodium polyoxyethylene lauryl ether sulfate (trade name is EMAL 20C (manufactured by Kao Corporation): cationic surfactant) is added to the solution such that the amount of sodium polyoxyethylene lauryl ether sulfate becomes 0.01% by mass with respect to a polyimide precursor composition to be obtained. In addition, 72.72 g (247.16 mmol) of 3,3',4,4'-biphenyltetracarboxylic dianhydride (hereinafter referred to as BPDA: molecular weight is 294.22) is added to the solution, the resultant mixture is stirred to dissolve for 24 hours while maintaining the reaction temperature at 20° C., and the reaction is performed, whereby a polyimide precursor aqueous solution (B-1) is obtained.

Then, the film-forming properties and the mechanical properties (tensile strength and tensile elongation) of the formed coating film were evaluated in the same manner as in Example 3-1. The evaluation results are shown in Table 3-3.

Moreover, an imidation ratio of the produced polyimide precursor is 0.02, and as a result of measuring the amount of the terminal amino group described above, the produced polyimide precursor has an amino group at least a terminal.

Examples 3-8 to 3-22

Preparation of Polyimide Precursor Compositions (B-2) to (B-16)

Polyimide precursor compositions (B-2) to (B-16) are prepared in the same manner as in Example 3-7 except that the conditions of the polymerization step of the polyimide precursor composition are changed to the conditions described in Tables 3-3 to 3-5.

Then, the film-forming properties and the mechanical properties (tensile strength and tensile elongation) of the formed coating film were evaluated in the same manner as in Example 3-1. The evaluation results are described in Tables 3-3 to 3-5.

Moreover, as a result of the measurement of the terminal amino group amount described above, the polyimide precursor produced in Example 3-22 does not include the amino group terminal, however, the entire terminals of the polyimide precursor have carboxyl groups.

Comparative Example 3-2

Preparation of Polyimide Precursor Composition (Y-1)

—Polymerization Step—

900 g of water is filled in a flask provided with a stirring rod, a thermometer, and a dropping funnel. Here, 27.28 g (252.27 mmol) of PDA and 51.03 g (504.54 mmol) of MMO are added thereto, and the resultant mixture is stirred to disperse at 20° C. for 10 minutes. 72.72 g (247.16 mmol) of BPDA is added to the solution, the resultant mixture is stirred to dissolve for 24 hours while maintaining the reaction temperature at 20° C., and the reaction is performed, whereby a polyimide precursor composition (Y-1) is obtained.

Then, a film is formed in the same manner as in Example 3-1, and since the void trace, the surface unevenness, and marks occupied 90% or more of the film, the mechanical property evaluation is not possible to be performed.

Comparative Example 3-3

Preparation of Polyimide Precursor Composition (Y-2)

A polyimide precursor composition (Y-2) is prepared in the same manner as in Example 3-7 except that the conditions of the polymerization step of the polyimide precursor composition are changed to the conditions described in Table 3-6.

Then, the film-forming properties and the mechanical properties (tensile strength and tensile elongation) of the formed coating film are evaluated in the same manner as in Example 3-1. The evaluation results are shown in Table 3-6.

Comparative Example 3-4

Preparation of Polyimide Precursor Composition (Y-3)

A polyimide precursor composition (Y-3) is prepared in the same manner as in Example 3-7 except that the conditions of the polymerization step of the polyimide precursor composition are changed to the conditions described in Table 3-6.

Then, a film is formed in the same manner as in Example 3-1, and since the void trace, the surface unevenness, and marks occupied 90% or more of the film, the mechanical property evaluation is not possible to be performed.

Comparative Example 3-5

Preparation of Polyimide Precursor Composition (Y-4)

A polyimide precursor composition (Y-4) is prepared in the same manner as in Example 3-7 except that the conditions of the polymerization step of the polyimide precursor composition are changed to the conditions described in Table 3-6.

Then, the film-forming properties and the mechanical properties (tensile strength and tensile elongation) of the formed coating film are evaluated in the same manner as in Example 3-1. The evaluation results are shown in Table 3-6.

<Odor Test>

The tests are performed on odor of the polyimide precursor composition obtained in each example by a total of 10 people of testers A to J. The testers A to J are five men and five women who are chosen at random, and a method in which the sample identity is hidden, and a sample which is most foul-smelling is selected by the sample number was performed.

The odor test was performed two times. That is, an odor test (1) was performed using samples of the polyimide precursor compositions (A-1) to (A-6), and (X-1), and an odor test (2) was performed using samples of the polyimide precursor compositions (B-1) to (B-16), and (Y-1). The results of each odor test are shown in Table 3-7.

TABLE 3-1

| | | | Example-Comparative Example | | | | | |
|---|---|---|---|---|---|---|---|---|
| | | | Example 3-1 | Example 3-2 | Example 3-3 | Example 3-4 | Example 3-5 | Example 3-6 |
| Polyimide precursor composition | | | A-1 | A-2 | A-3 | A-4 | A-5 | A-6 | A-7 |
| Polymerization step | Tetracarboxylic dianhydride | Chemical species | BPDA | BPDA | BPDA | BPDA | BPDA | BPDA | BPDA |
| | | g | 58.77 | 58.77 | 58.77 | 58.77 | 58.77 | 72.52 | 58.77 |
| | | mmol | 199.75 | 199.75 | 199.75 | 199.75 | 199.75 | 246.48 | 199.75 |
| | Diamine compound | Chemical species | ODA | ODA | ODA | ODA | ODA | PDA | ODA |
| | | g | 41.23 | 41.23 | 41.23 | 41.23 | 41.23 | 27.48 | 41.23 |
| | | mmol | 205.92 | 205.92 | 205.92 | 205.92 | 205.92 | 254.12 | 205.82 |
| | Tetracarboxylic dianhydride/diamine compound (molar ratio) | | 0.88 | 0.88 | 0.88 | 0.98 | 0.98 | 0.98 | 0.98 |
| | Solvent 1 | Chemical species | THF | THF | THF | THF | THF | THF | THF |
| | | g | 360 | 360 | 360 | 360 | 360 | 360 | 320 |
| | Solvent 2 | Chemical species | Water | Water | Water | Water | | Water | Water |
| | | g | 40 | 40 | 40 | 40 | | 40 | 80 |
| | Solvent 1/solvent 2 | | 9/1 | 9/1 | 9/1 | 9/1 | 9/1 | 9/1 | 8/2 |
| | Liquid state | | Dissolution | Dissolution | Dissolution | Dissolution | Dissolution | Dissolution | Dissolution |
| | Imidation ratio | % | 0.02 | 0.02 | 0.02 | 0.02 | 0.02 | 0.08 | 0.03 |
| | Molecular weight | Mn | 20000 | 20000 | 20000 | 20000 | 20000 | 20000 | 15000 |
| | Polyimide precursor solid content | % | 20 | 20 | 20 | 20 | 20 | 20 | 20 |
| | Viscosity | Pa·s | 70 | 70 | 70 | 70 | 70 | 70 | 100 |

TABLE 3-1-continued

| | | | Example 3-1 | Example 3-2 | Example 3-3 | Example 3-4 | Example 3-5 | Example 3-6 | Example 3-6 |
|---|---|---|---|---|---|---|---|---|---|
| Amine salification step | Organic amine compound | Chemical species | DMAEt | DMAEt | DMAEt | DMAEt | γ-Pyc | DMAEt | DMAEt |
| | | g | 35.62 | 35.62 | 17.82 | 178.1 | 58.08 | 35.62 | 35.62 |
| | | mmol | 399.5 | 399.5 | 199.76 | 1997.5 | 399.5 | 399.5 | 399.5 |
| | Added solvent | Chemical species | Water | Water | Water | Water | Water | Water | Water |
| | | g | 400 | 400 | 400 | 400 | 400 | 400 | 400 |
| | Processing ratio | mol % | 100 | 100 | 50 | 500 | 100 | 100 | 100 |
| | Liquid state | | Dissolution | Dissolution | Dissolution | Dissolution | Dissolution | Dissolution | Dissolution |
| Solvent substitution step | Liquid state | | — | Dissolution | Dissolution | Dissolution | Dissolution | Dissolution | Dissolution |
| | Polyimide solid content | % | — | 13 | 13 | 13 | 13 | 18 | 18 |
| | Viscosity | Pa·s | — | 50 | 120 | 35 | 90 | 85 | 98 |
| | Water content in solvent | % | — | 94 | 98 | 86 | 92 | 92 | 96 |
| Surfactant | Trade name | | EMAL 20C | EMAL 20C | EMAL 20C | EMAL 20C | EMAL 20C | EMAL 20C | EMAL 20C |
| | Effective component | | POE-LE-SO3Na | POE-LE-SO3Na | POE-LE-SO3Na | POE-LE-SO3Na | POE-LE-SO3Na | POE-LE-SO3Na | POE-LE-SO3Na |
| | Added amount | % | 0.01 | 0.01 | 0.01 | 0.01 | 0.01 | 0.01 | 0.01 |
| Film-forming property | Void trace | | A | A | B | B | B | A | A |
| | Surface unevenness and marks | | A | A | B | B | B | A | A |
| Mechanical characteristic | Tensile strength | MPa | 190 | 190 | 190 | 190 | 190 | 190 | 190 |
| | Tensile elongation | % | 80 | 80 | 80 | 80 | 80 | 80 | 80 |

TABLE 3-2

| | | | Example-Comparative Example Comparative Example 3-1 X-1 |
|---|---|---|---|
| Polyimide precursor composition | | | |
| Polymerization step | Tetracarboxylic dianhydride | Chemical species | BPDA |
| | | g | 58.77 |
| | | mmol | 199.75 |
| | Diamine compound | Chemical species | ODA |
| | | g | 41.23 |
| | | mmol | 205.92 |
| | Tetracarboxylic dianhydride/diamine compound (molar ratio) | | 0.98 |
| | Solvent 1 | Chemical species | THF |
| | | g | 360 |
| | Solvent 2 | Chemical species | Water |
| | | g | 40 |
| | Solvent 1/solvent 2 | | 9/1 |
| | Liquid state | | Dissolution |
| | Imidation ratio | % | 0.02 |
| | Molecular weight | Mn | 20000 |
| | Polyimide precursor solid content | % | 20 |
| | Viscosity | Pa·s | 70 |
| Amine salification step | Organic amine compound | Chemical species | DMAEt |
| | | g | 35.62 |
| | | mmol | 399.5 |
| | Added solvent | Chemical species | Water |
| | | g | 400 |
| | Processing ratio | mol % | 100 |
| | Liquid state | | Dissolution |
| Solvent substitution step | Liquid state | | Dissolution |
| | Polyimide solid content | % | 13 |
| | Viscosity | Pa·s | 50 |
| | Water content in solvent | % | 94 |
| Surfactant | Trade name | | — |
| | Effective component | | — |
| | Added amount | % | — |
| Film-forming properties | Void trace | | D |
| | Surface unevenness and marks | | D |
| Mechanical characteristic | Tensile strength | MPa | — |
| | Tensile elongation | % | — |

TABLE 3-3

| | | | Example 3-7 | Example 3-8 | Example 3-9 | Example 3-10 | Example 3-11 | Example 3-12 |
|---|---|---|---|---|---|---|---|---|
| Polyimide precursor composition | | | B-1 | B-2 | B-3 | B-4 | B-5 | B-6 |
| Polymerization step | Tetracarboxylic dianhydride | Chemical species | BPDA | BPDA | BPDA | BPDA | BPDA | BPDA |
| | | g | 72.72 | 72.72 | 72.72 | 72.72 | 72.72 | 72.72 |
| | | mmol | 247.16 | 247.16 | 247.16 | 247.16 | 247.16 | 247.16 |

TABLE 3-3-continued

| | | | Example-Comparative Example | | | | | |
|---|---|---|---|---|---|---|---|---|
| | | | Example 3-7 | Example 3-8 | Example 3-9 | Example 3-10 | Example 3-11 | Example 3-12 |
| | Diamine compound | Chemical species | PDA | PDA | PDA | PDA | PDA | PDA |
| | | g | 27.28 | 27.28 | 27.28 | 27.28 | 27.28 | 27.28 |
| | | mmol | 252.27 | 252.27 | 252.27 | 252.27 | 252.27 | 252.27 |
| | Tetracarboxylic dianhydride/diamine compound (molar ratio) | | 0.98 | 0.98 | 0.98 | 0.98 | 0.98 | 0.98 |
| | Organic amine compound | Chemical species | MMO | MMO | MMO | MMO | MMO | MMO |
| | | g | 50.00 | 50.00 | 50.00 | 50.00 | 50.00 | 50.00 |
| | | mmol | 494.32 | 494.32 | 494.32 | 494.32 | 494.32 | 494.32 |
| | Processing ratio | mol % | 100 | 100 | 100 | 100 | 100 | 100 |
| | Solvent | Chemical species | Water | Water | Water | Water | Water | Water |
| | | g | 900 | 900 | 900 | 900 | 900 | 900 |
| | Polyimide precursor solid content | % | 13 | 13 | 13 | 13 | 13 | 13 |
| | Liquid state | | Dissolution | Dissolution | Dissolution | Dissolution | Dissolution | Dissolution |
| | Imidation ratio | % | 0.02 | 0.02 | 0.02 | 0.02 | 0.02 | 0.02 |
| | Molecular weight | Mn | 20000 | 20000 | 20000 | 20000 | 20000 | 20000 |
| | Polyimide solid content | % | 9.1 | 9.1 | 9.1 | 9.1 | 9.1 | 9.1 |
| | Viscosity | Pa · s | 60 | 60 | 60 | 60 | 55 | 62 |
| | Terminal amino group | | Containing | Containing | Containing | Containing | Containing | Containing |
| | Surfactant | Trade name | EMAL 20C | EMAL 2F-30 | OS soap | Antex EHD-400 | EMAL 20C | EMAL 20C |
| | | Effective component | POE-LE-SO3Na | L-SO3Na | O-COOK | POE-AE-PO(OH)(OK) | POE-LE-SO3Na | POE-LE-SO3Na |
| | | % | 0.01 | 0.01 | 0.01 | 0.01 | 0.1 | 0.001 |
| Film-forming properties | Void trace | | A | B | A | B | A | A |
| | Surface unevenness and marks | | A | B | A | B | A | A |
| Mechanical characteristic | Tensile strength | | 190 | 190 | 190 | 190 | 190 | 190 |
| | Tensile elongate | | 80 | 80 | 80 | 80 | 80 | 80 |

TABLE 3-4

| | | | Example-Comparative Example | | | |
|---|---|---|---|---|---|---|
| | | | Example 3-13 | Example 3-14 | Example 3-15 | Example 3-16 |
| Polyimide precursor composition | | | B-7 | B-8 | B-9 | B-10 |
| Polymerization step | Tetracarboxylic dianhydride | Chemical species | BPDA | PMDA | BTDA | BPDA |
| | | g | 58.9 | 51.52 | 74.32 | 72.72 |
| | | mmol | 200.24 | 236.21 | 223.7 | 247.16 |
| | Diamine compound | Chemical species | ODA | ODA | PDA | PDA |
| | | g | 40.9 | 48.24 | 25.45 | 27.28 |
| | | mmol | 204.27 | 240.92 | 235.35 | 252.27 |
| | Tetracarboxylic dianhydride/diamine compound (molar ratio) | | 0.98 | 0.98 | 0.98 | 0.98 |
| | Organic amine compound | Chemical species | MMO | MMO | MMO | MMO |
| | | g | 40.51 | 47.79 | 47.61 | 25.00 |
| | | mmol | 400.48 | 472.42 | 447.4 | 247.16 |
| | Processing ratio | mol % | 100 | 100 | 100 | 50 |
| | Solvent | Chemical species | Water | Water | Water | Water |
| | | g | 900 | 900 | 900 | 900 |
| | Polyimide precursor solid content | % | 13 | 13 | 13 | 13 |
| | Liquid state | | Dissolution | Dissolution | Dissolution | Dissolution |
| | Imidation ratio | % | 0.02 | 0.02 | 0.02 | 0.02 |
| | Molecular weight | Mn | 20000 | 20000 | 20000 | 20000 |
| | Polyimide solid content | % | 9.1 | 9.3 | 9.2 | 9.1 |
| | Viscosity | Pa · s | 40 | 40 | 30 | 100 |
| | Terminal amino group | | Containing | Containing | Containing | Containing |
| | Surfactant | Trade name | EMAL 20C | EMAL 20C | EMAL 20C | EMAL 20C |

TABLE 3-4-continued

| | | | Example 3-13 | Example 3-14 | Example 3-15 | Example 3-16 |
|---|---|---|---|---|---|---|
| | | Effective component % | POE-LE-SO3Na 0.01 | POE-LE-SO3Na 0.01 | POE-LE-SO3Na 0.01 | POE-LE-SO3Na 0.01 |
| Film-forming properties | Void trace | | A | A | B | B |
| | Surface unevenness and marks | | A | A | B | B |
| Mechanical characteristic | Tensile strength | | 190 | 190 | 190 | 190 |
| | Tensile elongation | | 80 | 80 | 80 | 80 |

TABLE 3-5

| | | | Example 3-17 | Example 3-18 | Example 3-19 | Example 3-20 | Example 3-21 | Example 3-22 |
|---|---|---|---|---|---|---|---|---|
| Polyimide precursor composition | | | B-11 | B-12 | B-13 | B-14 | B-15 | B-16 |
| Polymerization step | Tetracarboxylic dianhydride | Chemical species | BPDA | BPDA | BPDA | PMDA | BPDA | CBDA |
| | | g | 72.72 | 72.72 | 72.72 | 51.52 | 72.72 | 67.46 |
| | | mmol | 247.16 | 247.16 | 247.16 | 236.21 | 247.16 | 290.60 |
| | Diamine compound | Chemical species | PDA | PDA | PDA | ODA | PDA | 1,6-Cyclo-hexane-diamine |
| | | g | 27.28 | 27.28 | 27.28 | 48.24 | 27.28 | 32.54 |
| | | mmol | 252.27 | 252.27 | 252.27 | 240.92 | 252.27 | 284.96 |
| | Tetracarboxylic dianhydride/diamine compound (molar ratio) | | 0.98 | 0.98 | 0.98 | 0.98 | 0.98 | 1.02 |
| | Organic amine compound | Chemical species | MMO | 1-Methyl piperdine | N,N-dimethyl piperazine | 1-Methyl pyrrolidine | Morpholine | MMO |
| | | g | 250.00 | 50.00 | 50.00 | 47.79 | 43.07 | 58.79 |
| | | mmol | 2471.6 | 494.32 | 494.32 | 472.42 | 494.32 | 581.20 |
| | Processing ratio | mol % | 500 | 100 | 100 | 100 | 100 | 100 |
| | Solvent | Chemical species | Water | Water | Water | Water | Water | Water |
| | | g | 900 | 900 | 800 | 900 | 900 | 900 |
| | Polyimide precursor solid content | % | 13 | 13 | 13 | 13 | 13 | 13 |
| | Liquid state | | Dissolution | Dissolution | Dissolution | Dissolution | Dissolution | Dissolution |
| | Imidation ratio | % | 0.02 | 0.05 | 0.05 | 0.06 | 0.02 | 0.02 |
| | Molecular weight | Mn | 20000 | 100000 | 20000 | 20000 | 20000 | 20000 |
| | Polyimide solid content | % | 9.1 | 9.1 | 9.1 | 9.3 | 9.1 | 9.1 |
| | Viscosity | Pa·s | 10 | 40 | 40 | 20 | 60 | 30 |
| | Terminal amino group | | Containing | Containing | Containing | Containing | Containing | Not detected |
| | Surfactant | Trade name | EMAL 20C | EMAL 20C | EMAL 20C | EMAL 20C | EMAL 20C | EMAL 20C |
| | | Effective component % | POE-LE-SO3Na 0.01 | POE-LE-SO3Na 0.01 | POE-LE-SO3Na 0.01 | POE-LE-SO3Na 0.01 | POE-LE-SO3Na 0.01 | POE-LE-SO3Na 0.01 |
| Film-formimg property | Void trace | | B | A | B | A | B | B |
| | Surface unevenness and marks | | B | A | C | A | C | B |
| Mechanical characteristic | Tensile strength | | 190 | 190 | 190 | 190 | 190 | 190 |
| | Tensile elongation | | 80 | 80 | 80 | 80 | 80 | 80 |

TABLE 3-6

| | | | Comparative Example 3-2 | Comparative Example 3-3 | Comparative Example 3-4 | Comparative Example 3-5 |
|---|---|---|---|---|---|---|
| Polyimide precursor composition | | | Y-1 | Y-2 | Y-3 | Y-4 |
| Polymerization step | Tetracarboxylic dianhydride | Chemical species | BPDA | PMDA | BTDA | BPDA |
| | | g | 72.72 | 51.52 | 74.32 | 58.9 |
| | | mmol | 247.16 | 236.21 | 223.7 | 200.24 |

TABLE 3-6-continued

| | | | Example-Comparative Example | | | |
| --- | --- | --- | --- | --- | --- | --- |
| | | | Comparative Example 3-2 | Comparative Example 3-3 | Comparative Example 3-4 | Comparative Example 3-5 |
| | Diamine compound | Chemical species | PDA | ODA | PDA | ODA |
| | | g | 27.28 | 48.24 | 25.45 | 40.9 |
| | | mmol | 252.27 | 240.92 | 235.35 | 204.27 |
| | Tetracarboxylic dianhydride/diamine compound (molar ratio) | | 0.98 | 0.98 | 0.98 | 0.98 |
| | Organic amine compound | Chemical species | MMO | MMO | MMO | MMO |
| | | g | 51.03 | 47.79 | 47.61 | 40.51 |
| | | mmol | 494.32 | 472.42 | 447.4 | 400.48 |
| | Processing ratio | mol % | 100 | 100 | 100 | 100 |
| | Solvent | Chemical species | Water | Water | Water | Water |
| | | g | 900 | 900 | 900 | 900 |
| | Polyimide precursor solid content | % | 13 | 13 | 13 | 13 |
| | Liquid state | | Dissolution | Dissolution | Dissolution | Dissolution |
| | Imidation ratio | % | 0.02 | 0.02 | 0.02 | 0.02 |
| | Molecular weight | Mn | 20000 | 20000 | 20000 | 20000 |
| | Polyimide solid content | % | 9.1 | 9.3 | 9.2 | 9.1 |
| | Viscosity | Pa · s | 60 | 60 | 60 | 55 |
| | Terminal amino group | | Containing | Containing | Containing | Containing |
| | Surfactant | Trade name | — | — | — | — |
| | | Effective component % | — | — | — | — |
| Film-forming properties | Void trace | | D | D | D | D |
| | Surface unevenness and marks | | D | D | D | D |
| Mechanical characteristics | Tensile strength | | — | 100 | — | 50 |
| | Tensile elongation | | — | 10 | — | 10 |

TABLE 3-7

| Tester | A | B | C | D | E | F | G | H | I | J |
| --- | --- | --- | --- | --- | --- | --- | --- | --- | --- | --- |
| ODOR TEST (1) | | | | | | | | | | |
| Gender | Male | Female | Male | Female | Female | Male | Female | Male | Female | male |
| Age | 23 | 25 | 27 | 28 | 32 | 33 | 39 | 43 | 49 | 52 |
| Sample giving off bad smell | X-1 | X-1 | X-1 | X-1 | X-1 | X-1 | X-1 | X-1 | X-1 | X-1 |
| ODOR TEST (2) | | | | | | | | | | |
| Gender | Male | Female | Male | Female | Female | Male | Female | Male | Female | Male |
| Age | 23 | 25 | 27 | 28 | 32 | 33 | 39 | 43 | 49 | 52 |
| Sample giving off bad smell | Y-1 | Y-1 | Y-1 | Y-1 | Y-1 | Y-1 | Y-1 | Y-1 | Y-1 | Y-1 |

From the above results, in the present examples, it is found that excellent results are obtained from the evaluation of the odor test of the polyimide precursor composition compared to the comparative examples.

In addition, in the present examples, it is found that excellent results are also obtained from the evaluation of the film-forming properties and mechanical properties of the formed coating film of the polyimide precursor composition compared to the comparative examples.

Moreover, abbreviations in Tables 3-1 to 3-6 are as follows. In addition, in Tables 3-1 to 3-6, "-" means "not added" or "not performed".

Tetracarboxylic dianhydride: "BPDA" (3,3',4,4'-biphenyltetracarboxylic dianhydride), "PMDA" (pyromellitic dianhydride), "BTDA" (benzophenone tetracarboxylic dianhydride), and "CBDA" (cyclobutane-1,2,3,4-tetracarboxylic dianhydride)

Diamine compound: "ODA" (4,4'-diaminodiphenyl ether), and "PDA" (p-phenylenediamine)

Organic amine compounds: DMAEt (dimethyl amino ethanol: tertiary amine compound: boiling point is bp. 133° C. to bp. 134° C.), γ-Pyc (γ-picoline: tertiary amine compound: boiling point is bp. 145° C.), MMO (methylmorpholine: tertiary amine compound), 1-methyl piperidine (tertiary amine compound: molecular weight is 99.17), N,N-dimethyl piperazine (tertiary amine compound: molecular weight is 114.19), 1-methyl pyrrolidine (tertiary amine compound: molecular weight is 85.15), and morpholine (secondary amine compound: molecular weight is 87.1)

Surfactant (anionic surfactant): POE-LE-SO3Na (sodium polyoxyethylene lauryl ether sulfate, trade name "EMAL 20C (manufactured by Kao Corporation)"), L-SO3Na (sodium lauryl sulfate, trade name "EMAL 2F-30 (manufactured by Kao Corporation)"), O-COOK ((potassium oleate, trade name "OS soap (manufactured by Kao Corporation)"), and POE-AE-PO (OH) (OK) (polyoxyalkylene alkyl ether phosphate, trade name "Antox EHD-400 (manufactured by Nippon Nyukazai Co., Ltd.)")

Solvent: THF (tetrahydrofuran: water-soluble ether-based solvent: boiling point is bp. 67° C.), NMP (N-methyl-2-pyrrolidone)

Moreover, in the examples, "processing ratio" in the amine salification step and the polymerization step is the amount of the organic amine compound (mol %) with respect to the theoretical amount of the carboxyl group included in the polyimide precursor. Here, the theoretical amount of the carboxyl group represents a value obtained by doubling the molar amount of the tetracarboxylic acid included in the polyimide precursor.

What is claimed is:

1. A polyimide precursor composition, comprising:
a resin having a repeating unit represented by the following general formula (I), an organic tertiary amine compound, and a surfactant dissolved in a water-based solvent including water:

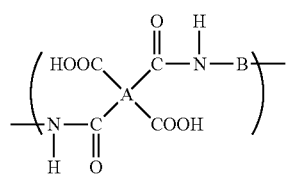

(I)

in the general formula (I),

A represents a tetravalent organic group derived from the group consisting of 3,3',4,4'-biphenyltetracarboxylic dianhydride, pyromellitic dianhydride, benzophenone tetracarboxylic dianhydride, and cyclobutane-1,2,3,4-tetracarboxylic dianhydride, and B represents a divalent organic group derived from the group consisting of 4,4'-diaminodiphenyl ether, p-phenylenediamine, and 1,6-cyclohexane diamine, wherein the surfactant is a cationic surfactant, wherein the cationic surfactant is a quaternary ammonium salt represented by the following general formula (II):

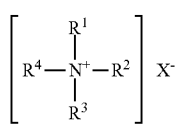

(II)

in the general formula (II),

X represents a chlorine atom or a bromine atom, and each of $R^1$, $R^2$, $R^3$, and $R^4$ independently represents an organic group having 1 to 22 carbon atoms, wherein the organic tertiary amine compound is present in an amount of 30 to 500 mol % with respect to the carboxyl group included in the polyimide precursor composition, and wherein the cationic surfactant is present in an amount of 0.001 to 0.1% by mass with respect to a total mass of the polyimide precursor composition.

2. The polyimide precursor composition according to claim 1,
wherein a molecular weight of the cationic surfactant is 200 or greater.

3. The polyimide precursor composition according to claim 1,
wherein the resin includes a resin having the amino group at the terminal.

4. The polyimide precursor composition according to claim 1,
wherein the resin is a resin synthesized from an aromatic tetracarboxylic dianhydride and an aromatic diamine compound.

5. The polyimide precursor composition according to claim 1,
wherein the resin includes a resin having the amino group at the terminal.

6. A method for manufacturing a polyimide molded body, wherein the polyimide precursor composition according to claim 1 is molded by a heat treatment.

7. A polyimide molded body manufactured by the method for manufacturing a polyimide molded body according to claim 6.

8. A polyimide precursor composition, comprising
a resin having a repeating unit represented by the following general formula (I), an organic tertiary amine compound, and a surfactant dissolved in a water-based solvent including water:

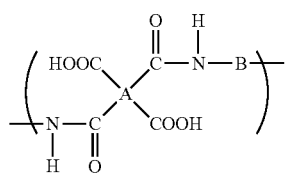

(I)

in the general formula (I),

A represents a tetravalent organic group derived from the group consisting of 3,3',4,4'-biphenyltetracarboxylic dianhydride, pyromellitic dianhydride, benzophenone tetracarboxylic dianhydride, and cyclobutane-1,2,3,4-tetracarboxylic dianhydride, and B represents a divalent organic group derived from the group consisting of 4,4'-diaminodiphenyl ether, p-phenylenediamine, and 1,6-cyclohexane diamine, wherein the surfactant is an anionic surfactant, wherein the anionic surfactant is at least one selected from a group consisting of surfactants represented by the following general formula (III-1), (III-2), (III-3), or (III-4):

(III-1)

$R^1$—O—$SO_3M^1$

(III-2)

$R^2$—O—$(CH_2CH_2O)_{\overline{n2}}$—$SO_3M^2$

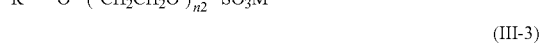

(III-3)

$R^3$—$COOM^3$

-continued

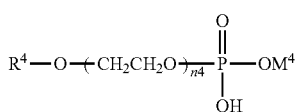

(III-4)

in the general formulas (III-1) to (III-4),
each of $R^1$, $R^2$, $R^3$, and $R^4$ independently represents a substituted or unsubstituted organic group having 8 or more carbon atoms,
each of $M^1$, $M^2$, $M^3$, and $M^4$ independently represents an alkali metal ion, an ammonium ion, or a substituted ammonium ion,
each of n2 and n4 independently represents an integer of 1 to 10,
wherein the organic tertiary amine compound is present in an amount of 50 to 500 mol % with respect to the carboxyl group included in the polyimide precursor composition, and
wherein the anionic surfactant is present in an amount of 0.001 to 0.1% by mass with respect to a total mass of the polyimide precursor composition.

9. The polyimide precursor composition according to claim 8,
wherein a molecular weight of the anionic surfactant is 250 or greater.

10. The polyimide precursor composition according to claim 8,
wherein the resin includes a resin having the amino group at the terminal.

11. The polyimide precursor composition according to claim 8,
wherein the resin is a resin synthesized from an aromatic tetracarboxylic dianhydride and an aromatic diamine compound.

12. The polyimide precursor composition according to claim 8,
wherein the resin includes a resin having the amino group at the terminal.

13. A method for manufacturing a polyimide molded body,
wherein the polyimide precursor composition according to claim 8 is molded by a heat treatment.

14. A polyimide molded body manufactured by the method for manufacturing a polyimide molded body according to claim 13.

15. A polyimide precursor composition, comprising:
a resin having a repeating unit represented by the following general formula (I), an organic tertiary amine compound, and a surfactant dissolved in a water-based solvent including water:

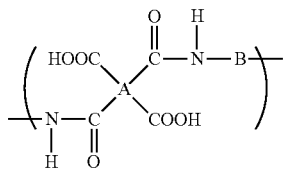

(I)

in the general formula (I),
A represents a tetravalent organic group derived from the group consisting of 3,3',4,4'-biphenyltetracarboxylic dianhydride, pyromellitic dianhydride, benzophenone tetracarboxylic dianhydride, and cyclobutane-1,2,3,4-tetracarboxylic dianhydride, and
B represents a divalent organic group derived from the group consisting of 4,4'-diaminodiphenyl ether, p-phenylenediamine, and 1,6-cyclohexane diamine,
wherein the surfactant is a nonionic surfactant,
wherein the nonionic surfactant is at least one selected from a group consisting of surfactants represented by the following general formula (IV-1), (IV-2), (IV-3), or (IV-4):

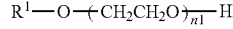

(IV-1)

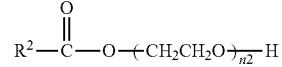

(IV-2)

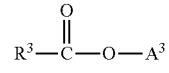

(IV-3)

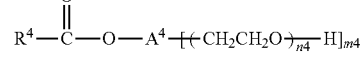

(IV-4)

in the general formulas (IV-1) to (IV-4),
each of $R^1$, $R^2$, $R^3$, and $R^4$ independently represents a substituted or unsubstituted organic group having 8 or more carbon atoms,
each of $A^3$ and $A^4$ independently represents a polysaccharide,
each of n1, n2, and n4 independently represents an integer of 1 to 10,
m4 represents an integer of 1 to 5,
wherein the organic tertiary amine compound is present in an amount of 50 to 500 mol % with respect to the carboxyl group included in the polyimide precursor composition, and
wherein the nonionic surfactant is present in an amount of 0.001 to 0.1% by mass with respect to a total mass of the polyimide precursor composition.

16. The polyimide precursor composition according to claim 15,
wherein a molecular weight of the nonionic surfactant is 250 or greater.

17. The polyimide precursor composition according to claim 15,
wherein the resin includes a resin having the amino group at the terminal.

18. The polyimide precursor composition according to claim 15,
wherein the resin is a resin synthesized from an aromatic tetracarboxylic dianhydride and an aromatic diamine compound.

19. The polyimide precursor composition according to claim 15,
wherein the resin includes a resin having the amino group at the terminal.

20. A method for manufacturing a polyimide molded body,
wherein the polyimide precursor composition according to claim 15 is molded by a heat treatment.

21. A polyimide molded body manufactured by the method for manufacturing a polyimide molded body according to claim 20.

* * * * *